US010846821B2

(12) United States Patent
Kolb, V et al.

(10) Patent No.: US 10,846,821 B2
(45) Date of Patent: *Nov. 24, 2020

(54) DIGITAL GRADIENT SIGNAL PROCESSING SYSTEM AND METHOD FOR VIDEO SIGNALS

(71) Applicants: John J. Kolb, V, Medford, MA (US); Kenneth Granville, Greenwood Village, CO (US)

(72) Inventors: John J. Kolb, V, Medford, MA (US); Kenneth Granville, Greenwood Village, CO (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/010,136

(22) Filed: Jun. 15, 2018

(65) Prior Publication Data

US 2018/0336661 A1 Nov. 22, 2018

Related U.S. Application Data

(63) Continuation of application No. 14/999,610, filed on Jun. 3, 2016, now Pat. No. 10,037,592.

(60) Provisional application No. 62/230,422, filed on Jun. 5, 2015.

(51) Int. Cl.

| | |
|---|---|
| ***G06T 3/40*** | (2006.01) |
| ***G06T 5/20*** | (2006.01) |
| ***G06T 5/00*** | (2006.01) |

(52) U.S. Cl.

CPC .............. *G06T 3/40* (2013.01); *G06T 3/4053* (2013.01); *G06T 5/003* (2013.01); *G06T 5/20* (2013.01); *G06T 2207/10016* (2013.01); *G06T 2210/36* (2013.01)

(58) Field of Classification Search

CPC . G06T 5/003; G06T 5/20; G06T 2207/10004; G06T 2210/36; G06T 3/40; G06T 2207/10016

USPC .......................................................... 382/299

See application file for complete search history.

(56) References Cited

U.S. PATENT DOCUMENTS

| | | | |
|---|---|---|---|
| 6,393,143 | B1 | 5/2002 | Pipitone |
| 6,396,496 | B1 | 5/2002 | Pfister et al. |
| 7,256,781 | B2 | 8/2007 | Shioya |
| 7,511,718 | B2 | 3/2009 | Subramanian et al. |
| 8,116,548 | B2 | 2/2012 | Zheng et al. |
| 8,553,935 | B2 | 10/2013 | Mandella et al. |
| 8,712,158 | B2 | 4/2014 | Bharath et al. |
| 8,780,235 | B2 | 7/2014 | Kobayashi |

(Continued)

FOREIGN PATENT DOCUMENTS

WO WO 2015/054666 4/2015

OTHER PUBLICATIONS

Ude, Ales. Nonlinear Least Squares Optimisation of Unit Quaternion Functions for Pose Estimation from Corresponding Features. Proceedings of the 14th International Conference.

(Continued)

*Primary Examiner* — Ruiping Li

(57) ABSTRACT

A system and method for improving the detail of an input digital video signal can be implemented by computing first and second order gradients of the input digital video signal in a neighborhood size of 1,2, 4,8 and 16 increments. This gradient information can be used to construct an output digital video signal that has greater detail than the input digital video signal.

20 Claims, 12 Drawing Sheets

(56) References Cited

U.S. PATENT DOCUMENTS

| | | | | |
|---|---|---|---|---|
| 9,792,491 | B1 * | 10/2017 | Ramaswamy | G06K 9/00362 |
| 2009/0148062 | A1 * | 6/2009 | Gabso | G06T 5/002 382/266 |

OTHER PUBLICATIONS

Arnold, Mark G. et al. Towards a Quaternion Complex Logarithmic Number System. 2011 20th IEEE Symposium on Computer Arithmetic, 2011.

* cited by examiner

310

330

Input signal definition table

| X-location | Y-location | Value |
|---|---|---|
| 231 | 187 | 2 |
| 232 | 187 | 1 |
| 231 | 188 | 0 |
| 232 | 188 | 1 |
| ... | ... | ... |

331

332

Compute first-order and second-order gradient information sets — 410

Convert gradient information to quaternions — 430

Calculate quaternion logarithms — 440

310

454

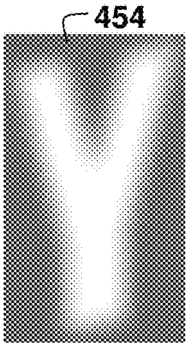

452

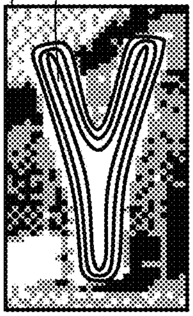

450

Quaternion logarithm records

| X-location | Y-location | N-size | Quaternion Log | |
|---|---|---|---|---|
| | | | *a* | *b* |
| ... | ... | ... | ... | ... |
| 231 | 187 | 1 | 27 | 82 |
| ... | ... | ... | ... | ... |

Upsample using piecewise polynomial curve fit — 460

472

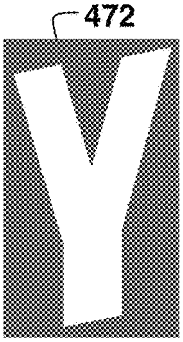

470

Output signal definition table

| X-location | Y-location | Value |
|---|---|---|
| ... | ... | ... |
| 2317 | 1873 | 1 |
| ... | ... | ... |

490

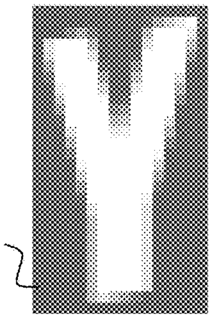

```
x1 = v2.x - v1.x;        =  0.500 - 0 =  0.500
x2 = v3.x - v1.x;        =  0.866 - 0 =  0.866
y1 = v2.y - v1.y;        =  0.866 - 0 =  0.866
y2 = v3.y - v1.y;        =  1.400 - 0 =  1.400
z1 = v2.z - v1.z;        =  0.600 - 0 =  0.600
z2 = v3.z - v1.z;        =  1.400 - 0 =  1.400
s1 = w2.x - w1.x;        = -0.707 - 0 = -0.707
s2 = w3.x - w1.x;        =  0.000 - 0 =  0.000
t1 = w2.y - w1.y;        =  0.707 - 0 =  0.707
t2 = w3.y - w1.y;        =  1.000 - 0 =  1.000
r1 = 1 / (s1 * t2 - s2 * t1);
   = 1 / ( -0.707 * 1 -  0.707 * 0)
   = 1 / -0.707                       = -1.414

T.xyz = ((t2 * x1 - t1 * x2) * r1,
         (t2 * y1 - t1 * y2) * r1,
         (t2 * z1 - t1 * z2) * r1 )

T.x = ( 1 * 0.5 - 0.707 * 0.866 ) * 1.414
    = ( 0.5 - 0.612 ) * 1.414 = -0.158

T.y = ( 1 * 0.866 - 0.707 * 1.4 ) * 1.414
    = ( 0.866 - 1 ) * 1.414   = 1.225

T.z = ( 1 * 0.6 - 0.707 * 1.4 ) * 1.414
    = ( 0.6 - 1. ) * 1.414    = 0.566

T.xyz = { -0.158, 1.225, 0.566 }

B.xyz = ((s1 * x2 - s2 * x1) * r1,
         (s1 * y2 - s2 * y1) * r1,
         (s1 * z2 - s2 * z1) * r1);

B.x = ( 0.707 * 0.866 - 0 * 0.5 ) * 1.414
    = ( 0.612 - 0.5 ) * 1.414 = 0.158

B.y = ( 0.707 * 1.4 - 0 * 0.866 ) * 1.414
    = ( 1 - 0.866 ) * 1.414   = 0.189

B.z = ( 0.707 * 1.4 - 0 * 0.6 ) * 1.414
    = ( 1. - 0 ) * 1.414      = 1.414

B.xyz = { 0.158,  0.189, 1.414 }

N.xyz = ( T - B * Dot(B, T));

(T-B) = {-0.158,_1.225,  0.566} - {0.158, 0.189, 1.414}
      = {-0.316, 1.036, -0.848}

Dot(B,T) = 0.025 + 0.232 + 0.800 = 1.057

T-B * Dot(B,T) = 1.057 * { -0.316, 1.036, -0.848 }

N.xyz = ( -0.334, 1.095, -0.896 )
```

FIG. 8

```
Quaternion Q.xyzw   <- Q[0] = Q.x ; Q[1] = Q.y ; Q[2] = Q.z ; Q[3] = Q.w

Trace = M[0].x + M[1].y + M[2].z;
      = -0.158 + 1.225 + 0.566
      =  1.633

if( Trace > 0.0 )
{
    s = sqrt( Trace + 1 )
      = sqrt( 1.633 + 1 )
      = 1.627

    Q.w =(s * (0.5))
        = 1.627 * 0.5
        = 0.811

    s = (0.5) / s
      = 0.5 / 1.627
      = 0.307

    Q.x = ((M[2].y - M[1].z) * s);
        = ( 1.095 - 1.414 ) * 0.307
        = -0.098

    Q.y = ((M[0].z - M[2].x) * s);
        = ( 0.566 - ( -0.334 ) ) * 0.307
        = 0.276

    Q.z = ((M[1].x - M[0].y) * s);
        = ( 0.158 - 1.225 ) * 0.291
        = -0.328
}
else  <-- This is the alternate slower calculation
{
    int i = M[0].x < M[1].y ?
    (M[1].y < M[2].z ? 2 : 1) :
    (M[0].x < M[2].z ? 2 : 0);
    int j = (i + 1) % 3;
    int k = (i + 2) % 3;

    F_t s = sqrt(M[i][i] - M[j][j] - M[k][k] + F_t(1.0));
    Q[i] = s * (0.5);
    s = F_t(0.5) / s;

    Q.w = (M[k][j] - M[j][k]) * s;
    Q[j] = (M[j][i] + M[i][j]) * s;
    Q[k] = (M[k][i] + M[i][k]) * s;
}

Quaternion Q = { -0.098, 0.276, -0.328, 0.811 }
```

FIG. 9

$$\mathrm{Log}(\mathbf{q}) = \left(\mathrm{Log}|\mathbf{q}|\ ,\ \frac{\mathbf{v}}{|\mathbf{v}|}\arccos\frac{\mathbf{s}}{|\mathbf{q}|}\right)$$

where:

q is a hypercomplex number expressed as a quaternion wherein the quaternion comprises an imaginary quaternion portion and a real quaternion portion;

s is the imaginary quaternion portion of the quaternion (q);

v is the real quaternion portion of the quaternion (q);

|q| is the length (also known as magnitude) of q; and

|v| is the length (also known as magnitude of v

FIG. 10A

```
Q.xyzw = { -0.098, 0.276, -0.328, 0.811 }

Magnitude = sqrt( Dot( Q.xyz ) );
          = sqrt( Q.x^2 + Q.y^2 + Q.z^2 )
          = sqrt((-0.098)*(-0.098)+(0.276)*(0.0276)+(0.0328)*(0.328))
          = sqrt( 0.197 )
          = 0.443

Coefficient = if( Magnitude > 0 ) then
               { Arctangent( Magnitude, Q.w ) / Magnitude }
               else { 0 };

Calculation for Magnitude > 0:
    Coefficient = Arctangent( Magnitude, Q.w )
                = Arctangent( Mag, Q.w ) / Magnitude
                = Arctangent( 0.440, 0.811 ) / 0.440
                = 1.129
    Note that actual Coefficient value is 1.1285581587203304

QuaternionLog Qlog.xyz = Q.xyz * Coeff;
                       = { -0.098, 0.276, -0.328 } * 1.129
                       = { -0.111, 0.312, -0.370 }

Log(Q) = { -0.111, 0.312, -0.370 }
```

FIG. 10B

DIGITAL GRADIENT SIGNAL PROCESSING SYSTEM AND METHOD FOR VIDEO SIGNALS

CROSS REFERENCE TO RELATED APPLICATIONS

This application is a continuation of U.S. patent application Ser. No. 14/999,610 filed Jun. 3, 2016, which claims benefit of U.S. Provisional Patent Application Ser. No. 62/230,422 filed 5 Jun. 2015, the entire disclosures of which is incorporated by reference herein.

BACKGROUND

The present invention relates to computational processes and more specifically to: (a) digital signal processing of static images, moving images, and other data types; (b) performance optimization of multi-processor systems; (c) natural language interfaces; and (d) improved and customizable web browsers.

Video and still motion image displays are available at increasingly better image detail (also known as sharpness, definition, fidelity, image resolution, and/or image quality) as measured by pixel densities, pixel amplitude resolution, color rendering accuracy, frame rates, screen sizes, screen resolutions, and/or the number of actual and perceived dimensions presented. There is great interest in improved and more immersive video experiences using technologies such as virtual reality, augmented reality, higher definition displays (4K and beyond), and 360-degree cameras that allow the individual to chose where to zoom and pan. User experiences with other types of streaming data, such as sound, are also improved when detail is improved relative to the common digital audio standards in use today. All of these higher detail data streams can require larger data file sizes or better ways to compress, transmit, manage, decompress, and upsample data that is stored and transmitted in a compact form. Data transmission technology is not keeping up with the increasing quantity of data to be moved, stored, and processed. Multi-processor systems are becoming increasingly prevalent, but it is challenging to effectively and efficiently use the computing potential of a multi-processor system. There is a need to solve these issues algorithmically and computationally. As computation becomes more complex and computational devices become more ubiquitous, user interfaces need to become more intuitive or use natural language. For example, it is desired to have web browsers that provide a better user experience.

BRIEF DESCRIPTION OF THE DRAWINGS

For a more complete understanding of the present invention and the advantages thereof, reference is made to the following description taken in conjunction with the accompanying drawings in which like reference numerals indicate like features and wherein:

FIG. 4 shows how a quaternion-logarithm-based signal processing system and method can be used to improve two-dimensional digital image detail;

FIG. 8 shows an example calculation for generating a gradient vector matrix;

FIG. 9 shows an example calculation for converting a vector matrix to a quaternion;

FIG. 10A shows a first method for computing the logarithm of a quaternion;

FIG. 10B shows a sample calculation using a second method for computing the logarithm of a quaternion;

Figure 1:
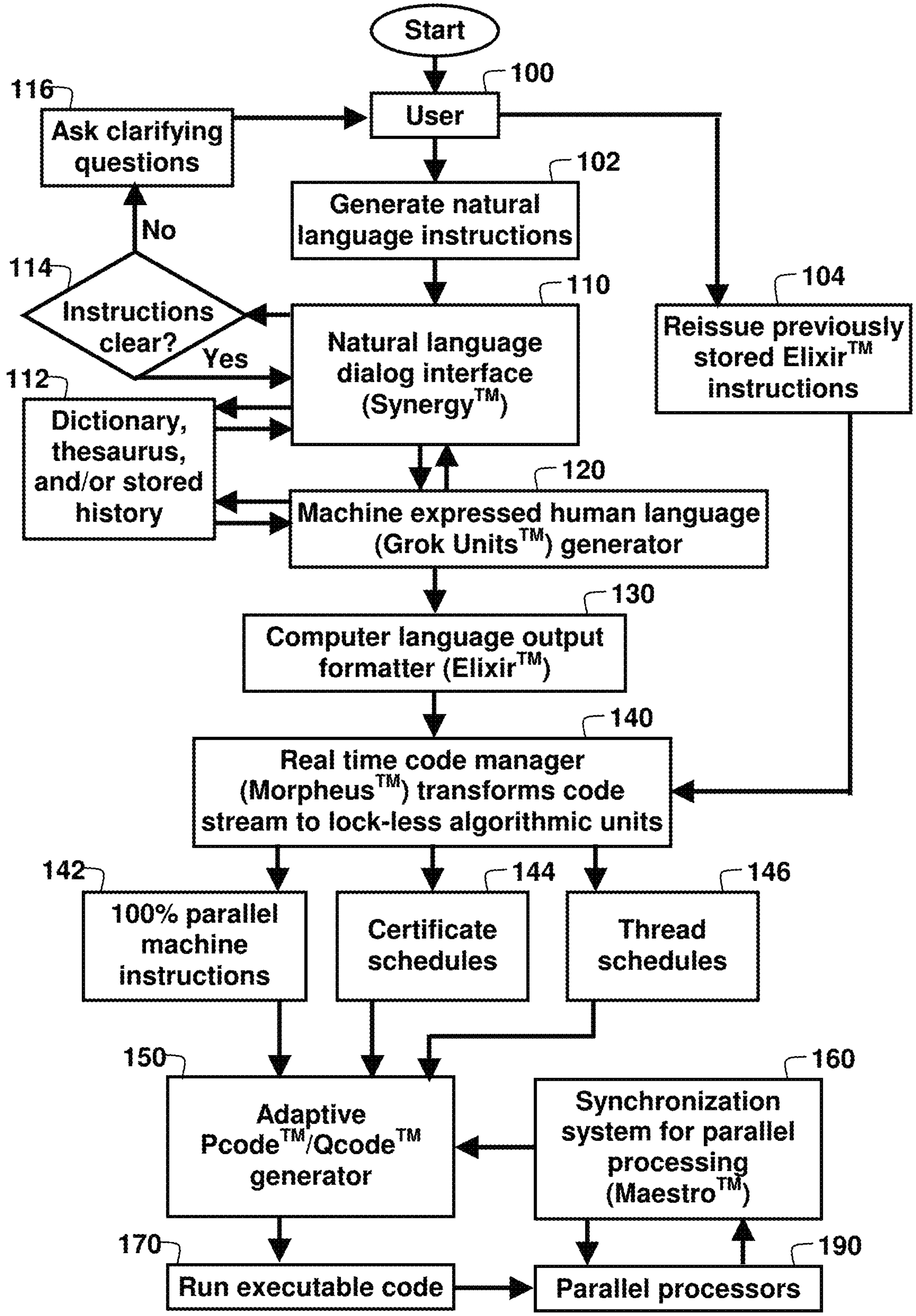
FIG. 1 shows an adaptive multiprocessor computing system and method.

The following glossary is provided to further aid in understanding some of the terminology used in this disclosure:

| Term | Short technical description |
|---|---|
| Blackbird-Pi ™ | Hardware/software compute capability scaling system |
| Centurion ™ | Dynamically added/removed native code manager |
| Chameleon ™ | Internal code translation engine |
| Elixir ™ | Computer language output formatter |
| Elsewhered ™ | Heuristic visual element extractor |
| Essence ™ | Adaptive computer code generator |
| Essence Data Prism ™ | Web page content converter |
| Grok Units ™ | Machine expressed human language |
| illumin8 ™ | Digital signal processing module for images and other data types |
| Maestro ™ | Synchronization system for parallel processing |
| Morpheus ™ | Real time code manager |
| Nebulo ™ | Data identifier assignment and management module |
| Neutral Zone ™ | Malware defense mechanisms |
| Osmosys ™ | Multi-signal mixer |
| Pcode ™ | Platform specific code generator |
| Qcode ™ | Adaptive computer code generator |
| StreamWeave ™ | Data stream packetizing system |
| Synergy ™ | Natural language dialog interface |
| TimeWarp ™ | Real time data change management system |
| Umbra ™ | Stored code encryption and/or obfuscation |
| UnCloak ™ | Data transformer |

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment.

It should be understood that various changes could be made in the function and arrangement of elements without departing from the spirit and scope as set forth in the appended claims. Preferred embodiments of the present invention are illustrated in the Figures, like numerals being used to refer to like and corresponding parts of the various drawings. Specific details are given in the following description to provide a thorough understanding of the embodiments. However, it will be understood by one of ordinary skill in the art that the embodiments may be practiced without these specific details.

1. Overview of the System and Method.

Embodiments of the present invention comprise one or more computational systems or methods that that can adapt in order to process data efficiently. The primary component of the overall system is a code generator (Essence™) that automatically generates, adapts, and/or optimizes computer-readable code for parallel processing in response to an evaluation of memory latency, a count of the number of data fetches, a count of the number of instruction cycles, the order of the instructions in the instruction pipeline, and the size of the instruction cache. The automatic computer code generator can also be responsive to an assessment of processor capabilities such as vector size that can be processed in one clock cycle, availability of hyper-threading, availability of true parallel execution, and clock speed. As a result, the code output of the automatic computer code generator can be different (and therefore better performance optimized) based on whether the target is a standard single processor versus a multi-threaded parallel processor versus a processor capable of efficiently processing vector instructions, or some combination thereof. The automatic computer code generator can further include hardware or software that optimizes performance for distributed computing in a network environment. The adaptive computer code generator (Essence™) can include:

- The ability to operate as a series of independent worker threads that input and output tasks. The automatic computer code generator can schedule and fill task queues based on priorities, quality, and/or deadlines. These task queues can be shared as nearby tasks and far away tasks. Tasks can be scheduled with goals of when they'll be done based on estimated task duration. This estimated task duration can sometimes be accurately estimated and sometimes not be accurately determined. Probabilities can be used to anneal estimates toward more reliable accuracy. There can be probabilities assigned and stored with these tasks such as (1) best-case, (2) worst-case, (3) average-case, and (4) past-predicted case estimates. These estimates can be compared with actual past results. These probabilities can be used to estimate likely time for completion of a computing task and cost of completing a task including the risks and costs of cache-misses, CPU write stalls, GPU read-then-write stalls.
- A module that processes digital signals such as static images, moving images, and other data types (illumin8™). This digital signal processing module can include an object-based device or program that compresses and/or decompresses data (also known as a codec) that further provides bit-level control of selected collections of data. The data processed by the digital signal processing module can be static data or non-static data. The data can comprise text data. The data can comprise audio data. The data can comprise video data. The data can comprise discrete data and/or markup within, and/or separate from, a video stream. The video stream could be live or recorded. The module can further include functionality that facilitates the identification of one or more visual elements in a static image or a video stream. The module can provide real time masking. The module can provide real time image quality enhancement through upsampling of the pixel density in the image. The module can provide real time depth buffering, real time hue aligning, real time depth merging, real time markup, real time change detection, and/or real time pattern matching. The module can include functionality to compose and place enhanced video elements into a video scene in dimensions (3 spatial dimensions plus time), 3 dimensions (two planar dimensions plus time or three spatial dimensions) or in 2 dimensions (two spatial dimensions or one dimension such as audio amplitude plus time). The upsampling (also known as resolution enhancement, pixel density improvement, increasing image detail, or image fidelity improvement) by the digital signal processing module can comprise shape and/or motion reconstruction. The shape reconstruction can comprise curvature reconstruction. The image processing module can have functionality to match previous cases of shape and/or motion. The codec can associate visual elements with activities, behaviors, and perform real time updates using any input source capable of being understood by anyone skilled in the art such as natural language interfaces, gestures, data streams (both structured or unstructured), and transducers. The image processing module or codec can have functionality to export the resulting video stream in a standard format such as H.264, JPEG, TIFF, GIF, PNG, PDF, or a Raw file format. Upsampling (increasing the resolution, detail, or fidelity of a signal) can be used on a variety of different types of signals, including sounds, static images, and moving video. The goal of upsampling is to maximize perceived detail to a human user using algorithms and techniques. These algorithms and techniques can rely on signal theory and an understanding of human perception to remove noise, enhance certain types of detail, and allow editors creative freedom in how they transform signals. In the prior art, upsampling of a signal such as a 2D color signal used as a static image or a 3D color signal used as a video (with each frame being in the 3rd depth dimension), has been done by processing a grid of pixels. Grid methods typically rely on neighboring pixel information to predict the colors or other values that are most likely present in a higher pixel density (i.e. more detailed, sharper, or higher resolution) version of the original image or video. Common techniques for doing this prior art grid-based upsampling include preserving or eliminating edges or softening and/or smoothing noise. Popular imaging software, such as Adobe's Photoshop, provides filters such as Lanczos (most common), various Gaussian kernels, and other finite impulse response filters to alter the original image and remove harsh grid boundaries. These prior art grid-based techniques force a tradeoff between seeing pixel edges or blurring and therefore softening the image. It can be possible to use the signal processing module (illumin8™) to increase perceived static and moving image detail (also known as pixel density, fidelity, or resolution) and quality without the tradeoff of blurring and softening the image. Signal fields (such as images and video) can be processed into visual elements. These visual elements can be converted to gradient streams of information.

This allows embodiments of the present invention to preserve silhouettes and later sample the visual elements at different levels of detail (pixel densities or image resolutions), depending on the level of detail desired. This not only helps preserve continuous edges, color bands, and textured patterns, but also removes the appearance of blocky chunks that reveal the underlying grid structure of the pixels. Embodiments of the present invention use an approach that is somewhat analogous to turning pixel art into a vector representation, with some important differences. Vector images, such as the SVG (scalable vector graphics) format, contain geometric shapes based on mathematical primitives. However, none of these mathematical primitives, such as lines, curved lines, circles, spheres, polygons, polyhedral, can efficiently encode the types of two dimensional silhouettes or three dimensional sweeps that we see in natural photos or films. Natural images include people, trees, and other similar items.

Advanced pixel remapping capability within the static and moving image-processing module (illumin8™). Instead of attempting to remap a pixel grid into vectors, the system can remap the pixels of a visual element in an image into a spatially programmed ordering. This remapping is similar to Zigzag encoding and Morton ordering, but instead of following fixed steps, the signals (which can be sounds, images, or other vector fields of numbers in a fixed range) can be stored at a low pixel density as a distance field. Then an opcode indicates which dimension and direction to advance a change in that field, effectively carving out series of shapes with gradients in between, for all signal features. These distance fields are stored one dimension higher than the original signal, so a one-dimensional sound wave becomes a two-dimensional field of opcodes and wave-height-changes and a two-dimensional picture (grayscale or color) becomes a three-dimensional field of opcodes, locations, and brightness and/or color changes. Decoding a signal can be done in parallel with each step in the opcode dimension being separately expanded and then subsequent steps consolidated back into a final image at a final level of detail or pixel density. This process can be described as folding, where folding is defined as flagging the optimal next direction and magnitude to write the next one or more changes to the signal. The data stream can therefore be an orientation (such as north-east-23 degrees), magnitude (such as base scale of number precision, such as 0.0001, 0.1, or 1.0), and a series of changes or delta data. These instructions can form different densities of a distance field for each attribute of the signal (such as sound wave height, red, and blue). Sampling this distance field at any arbitrary step size can yield a pixel-density-appropriate summarization (if an image, signal, or other data file is down sampled) or interpolation (if an image, signal, or other data file is upsampled) from the original signal sampling frequency (image detail, image resolution, or pixel density). The benefits of a fuzzy distance field representation of a signal over a brute force representation are: (a) efficiencies in representing non-linear, non-rectangular, or non-cubic shaped elements; and (b) the ability to mix different sampling rates while keeping the signal element as sharp as is possible by using information that has been sampled at higher or lower rates.

Functionality within illumin8™ to encode and compresses signal data using an algorithm that runs as a mini program. This mini program can use 4-bit opcodes to describe the direction of a step, signal sample prediction, and changes to a resolution area. This allows larger and smaller areas to be predicted per step. 4-bit opcodes describes how data is packed in a signal that describes a visual element signal. In most file formats or network streaming methods of sharing signals, which include pictures, sounds, and movies (2 separate signals multiplexed together) are stored as data values ordered linearly. Sound data, such as music, usually represents a change in pressure representing a sound wave, and is stored as a series of numbers, each representing its fractional height from negative one to positive one or perhaps a change from the previous number. As an example, a 440 Hz middle-octave 'A' note might store values like 0.0, 0.1, 0.2, 0.4, 0.8, 0.9, 1.0, 0.9, 0.8, 0.4, etc. Image data, such as a photo, usually represents percentages a percentage of red, green, and blue light, so a 2×2 red and green checkerboard pattern might be stored as [100% Red, 0% Green, 0% Blue], [0% Red, 100% Green, 0% Blue], [0% Red, 100% Green, 0% Blue], [100% Red, 0% Green, 0% Blue], etc. These formats, generally with thousands, millions, or even billions of samples, are usually compressed by some transformation and encoding technique that helps store fewer bits. Embodiments of the system and method described herein can use similar transformations and encoding, but the raw format does not hold a linear sequence of data values. The raw format could hold one or more instructions (called "op-codes" because it is code that changes an operation) and data values (such as wave amplitudes and image color percentages) at a constant sampling rate (such as 44.1 kHz for sound or a 100×100 pixels for an image). The direction in which the data is read in prior art systems and methods is also fixed. Theses prior art systems and method always read the next value in order. The 4-bit opcodes make it possible to change the resolution and direction of reading data values resulting in separate-timbres in sounds and non-rectangular shapes in images. 4 bit implies 16 values but a 4-bit opcode is actually a prefix code that is followed by additional 4 to 20 bits of instruction, providing the potential for a small cache-friendly set of 16 choices with a lot of flexibility in finding exactly the data being sought, whether backwards or forwards in the data stream. Examples of these 16 include: resolution orientation such as turn up, turn left, turn down, turn right, go forward, go back, etc; or writing direction. This lets embodiments of the invention capture visual elements, such as a person's head, using only the pixels required to show the head. Prior art systems and methods typically store a grid of color percentages with no additional information available to accurately silhouette that head on a per-pixel basis. Exposing a writing direction allows embodiments of the invention to select natural gradients in the image frame and co-use data for image-visuals (color samples at different resolutions) as well as visual element boundaries to identify what is and is not a visual element.

Additional features in the digital signal processing module (illumin8™) such as:

(a) An ability to operate in a way that minimizes or eliminates blocked and/or pixilated edges, unless the scene that was originally digitized had these blocks or pixels;

(b) An ability to reproduce the original image grid of colors;

(c) An ability to differently handle different data elements in a stream and dynamically change detail (fidelity, pixel density, image resolution) based on the decoding needs, such as higher or lower bandwidth, visual elements of higher or lower interest, visual effects to promote focusing, such as depth of field, and other user interactivity;

(d) An ability to use of progressive downloading and very deep zooming of images; and (e) An ability to operate on top of other (rectangular grid based) filtering and rectangular encoding systems to further enhance perceived image quality. If the entire image is flagged as a singular rectangular visual element, then it is encoded as just that visual element, which a traditional filter can smooth (and therefore blur) it into progressive zooming.

A heuristic visual element extractor (Elsewhered™) for video streams. This visual element extractor could fuse the capabilities of a given sensor or media stream to help silhouette and extract visual elements for repurposing them in other media, such as video conferencing, movies, or social media compositions. Capabilities that can be supported include using edge-detection in single camera frames, motion edge perimetering in video feeds, depth samples in depth cameras, paired feature convergence and/or separation in stereo cameras, and point-samples in scanning devices. As the system extracts user-selected visual elements or most-likely-candidates for a visual element, the time-varying shape history can be stored to improve accuracy. The visual element can be upsampled using the static and dynamic image-processing module (illumin8™) to improve pixel density and detail as is required for a given task. For example, Elsewhered™ can be used to superimpose a visual element (for example a person's head or full body or an advertisement) into a scene. This can be accomplished by upsampling and/or reconstructing the visual element as four-dimensional spatial data using a three-dimensional distance field and a time-based derivative-field built with past changes—to keep future changes smoothly interpolated instead of jumping-about and scattering. This approach can create a physical shape and motion that can be used for physics and visuals. In terms of physics, the shape allows placement of the visual element into another virtual scene avoiding collisions and allowing interactions such as mist flowing around, the addition of water droplets, or other physical effects that might reinforce the believability of a given scene. In terms of visuals, once a shape has been formed, the system can compute surface angles and approximate the sources of lighting as well as the material texture and color of the surfaces. This type of approximation facilitates the removal of lighting from the original scene and the reconstruction of appropriate lighting and shading wherever the visual element is being reinserted, allowing the system to reliably position a moving image of a person into a virtual three-dimensional scene for video conferencing. The illusion of a person's presence is delivered with the same lighting and visual cues as the scene itself. For films or two dimensional media, the system can make a more limited attempt given that the system must make larger guesses to fit the lighting environment of light sources coming from off screen. This approach can ensure that visual elements composited live into a streaming video can fit the palette better than the cut and paste visuals that stand out due to light sources being misaligned and general camera parameters being entirely different. The approach described here relies on upsampling different visual elements at different levels of detail to ensure the final output detail (fidelity or pixel density) is the same to the viewer's eye. Differing levels of detail can stand out easily to the human eye. By upsampling, approximating lighting, relighting shapes, and compositing the same levels of detail and the same level of detail, the system can bring a solution to live integration of differing visual elements into a single, immersive media stream.

A web page content converter (Essence Data Prism™) that can convert content from web pages into visual elements for later use. Using this web page content converter, video frames and audio can be output to a dynamic web page that is a composite of components from one or more web pages. This composite can be called a web prism. The dynamic web page output can comprise additional visual elements that are generated and mixed within the same space and time as the original web content using technology such as HTML/CSS, JavaScript, Abobe Flash™, or Microsoft Silverlight™. While the movies transferred to the web browser using the web page converter are still generally H.264, MPEG-II, VP8, or another common video format, legal or physical data access can be restricted to the frames being displayed at the moment and to the audio stream sent. This has the advantage that content can be controlled and secured by the server that streams the movie and controls the digital rights management of the film. The disadvantages can be that not all data in the source video can be accessed. For example, there is no ability to scan all the audio tracks to process the sounds ahead of time. There is currently also no means for reading subtitles or metadata such as GPS locations where filmed. Tags in the data for things such as color matching would also not be available. Color matching tags might be beneficial for providing an optimal display of a video image intended for presentation on a variety of screen types and color ranges of displays ranging from cell phones to high end televisions. To overcome some of these disadvantages, there can be other pathways for playing videos. For example, leveraging the digital signal processing module (illumin8™), the web page converter (Essence Data Prism™) can have access to full movie data from a local file, a networked file or a live network stream. In this model, all video frames can be scanned to create thumbnails ahead of time or to identify chapter boundaries, which video services such as Hulu and Vimeo can show if the user hovers a cursor over the timeline bar. This full movie data does not need to be accessed directly by the system for any possible user purposes. Metadata with the date, GPS coordinates, and associated data can be read for organizing or asking queries. Subtitles can be read and saved for later search matches. References and connections to a social-media posting can be tagged. Links and/or references between the video and other information can be added. In this configuration, audio mixes could be accessed for processing. For example the voice dialog for hard to hear films could be adjusted, boosting frequency ranges where hearing loss has begun. It would also be possible to create the immersive effect of a movie in a cinema versus in the bathroom. The audio could be turned into karaoke or narrated voiceover. When used in this way, the digital signal processing module (illumin8™) carries the potential for the user to do whatever he/she would like with all of the data associated with a static or moving image, not just the data that is shared and/or permitted by the server.

A data transformer (UnCloak™) that can serve a variety of purposes. It can help transmit high-definition visual elements in a video stream over an inadequate amount of bandwidth. It can do this by separating visual elements in a video stream, which allows them to be compressed at different levels of detail and streamed to multiple users with different priorities for each user. Visual element detection requires using sensor data, such depth samples per pixel or stereo divergence per frame pair, or computer vision algorithms like median cut to cluster objects by silhouette and progressive video frames. As visual elements are detected in video streams, they can be given persistent identifiers and may have overlap or hierarchy in the visual element segmentation so that a person, a head, and an eye are all considered visual elements in a video stream. Each visual element is unfolded, which is a predictive walking algorithm that reorders an arbitrary-shaped identifier frequency, two dimensional color image, three dimensional density scan or other data format with an additional dimension for time. Similar to Morton Ordering and other zigzag and/or alternating approaches, the bits are delta compressed compared to previous example and future predictions along with the walk direction that enables efficient encoding of nonlinear shapes. Transforming a signal, such as video, into a series of visual elements over time allows the system to refer to visual elements using names, history, and other vocabulary to potentially ask questions involving space (is X near Y, can A be seen by B), time (how long was A near B), and commands (notify me if anything similar to X appears). Beyond minimizing bandwidth costs, this approach allows remote consumers, signal-stream-providers, or analysts in the middle to directly control how they use available bandwidth, both in terms of multicast sharing of similar streams and peer-to-peer local resharing. It can also control how allotted bandwidth is spent. Visual elements, once identified, can be compared to an ever-growing list of peer shared or centrally deposited visual elements, for various scales and contexts, to develop unique histories and queriable databases. Note that given any matches are always probability based, the system can assume that true 100% identification should only come from a human source given the nature of a sound, color, light, or shape. This allows for a massive amount of data to accumulate with frequent changes and future shifts in assumptions about "who is who" or "what happened in this footage." The data transformation technology can work on a variety of data streams from analog signals. Examples can include: color, depth, and/or stereo cameras; microphones (which could use Fourier or Wavelet transforms to pull out frequencies), LiDAR (Light Detection and Ranging), and other sensors, as well as discrete unstructured data (key-value pairs), structured data (databases, spreadsheets), and arbitrary streams such as social media posts, web pages, documents, and presentations. Although this form of data transformation technology cannot provide object selection, interaction, and/or bandwidth control with today's video codecs such as H.264/265, it can directly write to and from those streams with reasonable compression gains. Overall, the data transformer (UnCloak™) provides all the functionality and performance and/or compression gains of prior art video codecs that become a rectangular-object of interest subset of its other features. However, the implementation in the present disclosure can add significant bandwidth gains; improved controls for the user, provider and/or manager; and the ability to transform the signal into visual elements with a history, questions and answers, and relations to other visual elements that prior art streams cannot provide. The functionality of including visual elements of interest can add considerable value to today's data and deliver on existing market needs.

Stored code encryption and/or obfuscation (Umbra™). The system can include an adaptive computer code generator (for Pcode™ or Qcode™) and can then obfuscate, compress, and/or encrypt these cacheable nuggets of auto-generated adaptive computer code so no source code is lying around in memory where it could be snooped, frozen and/or stolen for intellectual property value later. While this functionality could permit the auto generated adaptive computer code (Pcode™ or Qcode™) to be taken once it has been placed into an executable part of memory to be read and/or run, it can limit the possibility of damage because sections of code are only decoded in blocks when needed, making it significantly more challenging to rebuilding the entire puzzle of source code. The encryption, obfuscation, and compression of code also saves bandwidth and transfer energy in exchange for computational on-chip math costs in a highly parallel system.

A natural language dialog interface (Synergy™) that can connect users with the rest of the system, as well as other systems. It can operate without data wrappers. It can work with structured or unstructured data and does not require meta data. The natural language interface can be scalable. It can be used to ask questions, make statements, and instruct other parts of the system to run commands against disparate data. Embodiments of the natural dialog system can process large varieties of data. For example, the natural language system has been tested with over 262,000 unique collections of images, sounds, tables of synonyms, and dictionaries. The natural language interface can expose the data in the system as nouns so that these nouns can be modified, which is analogous to the use of adjectives in a human language. The nouns could also be queried. Terms (nouns and modifiers) can be matched using a thesaurus, synonym reduction, spelling-aware algorithms, and/or history of a user's (or group of users) use of a term in the past. These processes could also be used for verbs, detail modifiers (the equivalent of adverbs) and functional templates (which are the same as a prepositional clause). This functionality allows a user to describe what it wants the computer to do and to have the computing machine carry on a dialog of what it thinks was meant by the commands until the user provides confirmation that this is correct. The natural language interface (Synergy™) can use a computer language output language format (Elixir™) that expresses possible meanings for part or all of a human query as a set of candidate terms from which the user can make a selection. For example one of the candidate means for the term "fidget" might be presented back to the user as "limb or body motion+frequency relative to average motion+repeated". The natural language dialog interface (Synergy™) and computer language output language output format (Elixir™) can use probabilities such as fuzzy logic to help understand degree of certainty that a word or phrase means a particular thing. The natural language dialog interface can be responsive to exclamations such as "ugh this is painful waiting" and "seriously, why are we watching this bank" to help collect data for the user's experience, for additional feedback, analytics, or to complete older ongoing user tasks such as "remind me to drink some orange juice if I'm complaining a lot."

Virtual resource management functionality that includes a resource scheduler and real time optimization of storage and transmission of data by working directly with compressed data that does not need to be unpacked. The system can also include memory optimization and management functionality that can include in-memory processing, and real-time input/output sensing and auto scaling in response to the type, bandwidth, and structure of the data being received and transmitted.

High-level data structuring including the ability to interpret and transform data elements (structured and unstructured) into higher-level semantic data objects without the need for tagging. The system can further include functionality to automatically interpret, translate, and transfer structured or unstructured data, and this restructuring can be responsive to user input. The user input can be a natural language input. The data can also be automatically interpreted, translated, and transferred in response to the task that needs to be performed on the data.

The ability to compress and uncompress data as needed and to process compressed data directly without first uncompressing it. When considering that compression schemes are different methods of storing bits, the notion of taking those bits and performing traditional computational operations on them is not theoretically different than doing so on the original, native or raw bits. With raw bits, we might compare two values to determine if one equals or is greater than another. That comparison is different if the bits are twos-complement, ones-complement integer or various floating-point formats. Whether the instructions are bitwise logic, mathematics, or addressing calculations, the results are usually predictable in terms of precision and cycles to perform. Traditionally there are specific hardware-backed instructions on any given processing unit to perform these actions such IMUL or FMUL for x86 CPUs. We can use two models of compressing data determined by the data bits themselves. The first model is dictionary-compressed data, inspired by the Lempel-Ziv techniques where bits are frequency-compressed by referring to a common pattern, such as the letter 'e' showing up more frequently than letter 'x' in words. The second model is predicting-changes and recording unexpected changes to a predicted pattern, such as reading the pattern 1, 2, 3, 103, might compress as +1, +1, +1, +100 becomes 0,0,0, +99). Both approaches require history information on either the dictionary or previous values and a means to find where the bits occur to decode the value, perform an action on it, and then recode it without disrupting the flow of existing compressed data. First we have an addressing scheme to find any particular piece of information whether it is a quantity (scalar or vector value in a known range such as 1 to 100 or 0.001 to 0.999), a quality (a fixed set of symbols, like an alphabet, colors of the rainbow, words in a book), a reference (specific identifier value to find a piece of information at a particular time or context), or a container of further information. Everything stored in the automatic computer code generator (Essence™) can fall into one of those four categories and within each is a means to find its compressed bits in RAM or disk or via instructions to create and cache the information. Once the type and locale is determined, it can be brought into RAM and thus into a cacheline for the processor to read. A key approach of the method is to keep the decode info (whether dictionary or number-prediction-history) in a non-conflicting cacheline so when we use the value, we do not have any conflicts or stalls in processing. This can be done with a hash-encoding scheme built around XORing of RAM addresses to keep the size and number of d-cache lines distinct for loading a RAM address to processor. We can invert or rotate the decoding information to never map into the same cachelines as where we would store the data itself. This causes interleaving of all compressed bits, so if we have two chunks of compressed data, say a picture (P) and some contact info (C), we may store the decode and sequentially numbered chunks as P-Decode, P0, P1, P2, C0, C1, C-Decode, P3, C2, C3, C4 at runtime to avoid conflicts. Then when the instruction generator reads "Add value A to B", it pulls in A-Decode, A0, A1, etc. and B-Decode, B0, B1, etc. and generates instructions to convert B's representation to A's, perform a math or logic operation, and store, if needed, the answer in the old, now updated location for A0, A1, etc., or a new location A4, A5, if needed because it grew or contracted in terms of compression space. This process prevents any decompressed values from ever entering RAM in any form other than the compressed value. The values are in a machine-native raw state for the instruction needed, such as 64-bit twos compliment integer for integer add or 32 IEEE-54 float for divide, but only on the chip itself and the chip's L1 cacheline. Often comparisons, such as A=100 and B=111 are even in a non-native state on chip as B gets converted to A's base, which become A=0, B=+11, (needing only 4 bits to provide the answer). Note that there can be entirely different pathways used depending on whether values are merely read for comparison or calculations in a formula versus written. If written, a value may change and it may need more or less space given its compressed new value as well as the scheduled reads by other work, which can require the same value for the same context or time. Thus, usually these instructions feed into two other modules, a data identifier assignment and management module (Nebulo™) for addressing and/or finding information by context, and a real time data change management system (TimeWarp™) for addressing and/or finding information by time or by history of change.

A multi-signal mixer (or effects generator) that renders animations on the client device (Osmosys™). The effects generator can be responsive to external triggers.

An internal code translation engine (Chameleon™) that can transform computer code written in one programming language (such as source code written in C99) to computer code written in another programming language (such as source code written in C++11 and/or C89). The exported code can then be used by computer platform-specific build tools and compilers to operate on different computing platforms. The code translation engine can also modify the style of the generated code. The code translation engine can aid understanding of the purpose of code by remapping names, symbols and terms used within imported or generated code to standardized descriptors that an organization determines are most useful for maintaining code. Non-descript names can become names that are meaningful to organizations or teams of developers in ways that are consistent with decisions of today vs. the past when the code was originally written. The code translation engine can convert the computer code (including imported code) from a common industry standard language (such as Cobol) to a language specific to a multiprocessor system such as the input language for the adaptive computer code generator (Qcode™).

A real time code manager for multiple parallel code threads (Morpheus™) that can transform existing programming jobs into tiny algorithmic units. Examples might include identifying a search pattern, processing a mathematical formula, a file seek and read, and the reordering of data. Each of these algorithmic units can be expressed in different code templates that produce different machine instructions. Each of these instructions can be bundled and profiled for timing, for energy use, and for resource use and then separated to run on different processor cores based on scheduling access to changes in data. While some workloads, such as banking transaction processing, are intrinsically serial in nature, the latencies associated with the reading of caches, disk I/O, network packets, and other events can make it possible to split up the work for better performance in many cases. Some tasks, such as image rendering, sound rendering, and shape generation are inherently optimal for parallel processing. Other tasks such as searching for data patterns, sorting, running mathematical formulas, and logical decisions of a container of data, simulations, and synchronizing precisely-timed changes amongst machines can also be parallelized easily. This parallelization can be accomplished using a transform that allows all cores to run simultaneously (or go to sleep if idle) by transforming workloads into algorithmic units and scheduling their instructions across multiple computing processors. While some tasks inherently have delays, stalls or bottlenecks, the use of tiny algorithmic units maximizes performance with self-profiling and avoids the semaphore, mutex, or locking mechanisms that affect performance in many other parallel systems. This approach to handling work processing requires all work to be done, which is defined as any computational task expressed in the semantic units of the computer language output format (Elixir™), to be estimated for worst, average, and/or best case duration and resource usage. The methods used can be mappings between the semantic units and instruction blocks, such as: "iterate all elements in Collection A, for each element consider its value B, if it matches C, then add counter D". In English, a phrase like: "tell me who I know in Zaire" or "Please show me anyone in my contacts who resides in Zaire", will map to "Iterate all people in Contacts, Facebook Friends, and LinkedIN-Connects, and then for each person, if their residence is Zaire, add that person to the collection named 'People of Zaire' and then display 'People of Zaire'". While a simple example, it displays each expansion of a basic term into known resources, with a most-recently-stored value for a range (such as the last time we read Facebook Friend List, it was 1000) and iterating per person, using the btree-iterate approach. So the code used is determined for data-access, iteration-of-data, and operations on data (compare it to "Zaire" in this case, which might be GPS-distance or name match or any other method). These task histories can form an address that can be used by the data identifier assignment and management module (Nebulo™), which can live in RAM until the space is needed for something else. If RAM space is needed, the data can be cached to disk or dropped and recreated as needed. These task histories can store the combination of Semantic-Units (the template of activity, such as iterate, compare, find, add) with Data-Craft (which databases, which pieces of info used by the Semantic part) and Algorithmic Units. Algorithmic units identify which actual algorithms and data-reformatting-if-needed, was selected, such as using a linear iteration of consecutive addresses (array partition), an incremental pointer de-referencing (a doubly-linked-list), a hash-table, or tree/graph format, etc). which are generally governed by a top-level 'code-choice', a mid-level 'data-format' (XYZXYZXYZ or XXX YYY ZZZ), and low-level machine instructions (LD, LD, TST, JNE, etc.). As each task history grows in Data-Craft and Algorithmic Unit histories, the probabilities of making future choices shift based on the accuracy of estimation and the number of optional choices that remain. For some operations such as square root, there are 2 single-instructions and 4 multi-instruction methods to approximate the value, which is only 6 choices for low precision and only 2 choices for high-precision—a simple case because little variation is possible outside of reordering when the calculation is issued in the task pipeline. Other cases can be far more complex and have many more expressible choices, which means it may take longer to reach a locally optimal state. Regardless of how much task history data exists, all current tasks are assigned priorities and sorted by resources. We use the classic and effective 'greedy-solution' to this NP-complete task, often called the knapsack or traveling salesman problem. Any delays or missed durations are relayed to the user as required by the computer language output format (Elixir™) scope (such as tell me if late, ignore, or log). It is notable that processor selection alters the Algorithm Unit selection since different instructions may or may not be available as well as accessible ranges of memory usable. It simply results in certain task history scores being set as negative to indicate not applicable. This approach can have several layers of simulated annealing solution to the N-tasks using P-processors with I-instructions on R-resources problem. This approach relies on computations being expressed by the automatic computer code generator (Essence™). It uses the data identifier and management module (Nebulo™) to address the data and the computer language output format (Elixir™) to describe what to do with it.

A data identifier assignment and management system (Nebulo™) that assigns unique identifiers to each unit of information. The unique identifiers can be 128 bit IDs that can be mapped and addressable across multiple devices. These unique identifiers, which can also be called HashIDs, can serve as a way of tagging a file or object to allow it to be searched quickly without requiring any context for the search. The use of these unique identifiers can prevent the duplication of data since redundant copies of the data can be stored once with multiple pointers. The use of these unique identifiers can improve the speed for searches and reduce bandwidth required to perform searches. The use of these unique identifiers can be combined with probabilistic fuzzy data methods to compensate for spelling errors and other scoring-match-based searches.

A data stream packetizing system for transmission and reassembly across a network (Streamweave™). The data stream packetizing system can further be used to conceal the type of data that is contained in the packet (steganography) as well as encrypting the contents.

The use of machine-expressed human language (Grok Units™) to encode human languages, dialects, slang and other cultural conventions into a common machine-readable format. For example, the following expressions could all be stored the same way: "Hello <name>", "Hey <name.>", and "Bongiomo <name>.

A real time data change management system (Time-Warp™). The real time data change management system can be used to track, store, retrieve, and/or replay data changes.

Maestro™, a synchronization system that uses an automatic-tuning approach to balancing sensory-quality (such as visual detail or audio fidelity) with responsiveness to user input and latency of changes. Maestro™ can use a user's computer language output format (Elixir™) to detail a series of preferred tradeoffs in any specific sensory art bank or simulation chronicle. A sensory art bank can be a small rectangular area on a single screen showing a movie or web page or a five-screen wide view of a vast three-dimensional scene or an image on the shirt of a Lego figure inside that scene. For each sensory art bank, there is a tradeoff in how detailed the image or sound or motion or shape (for collision) will be versus how rapidly it responds to changes. For example, a three-dimensional simulation or high-definition movie that natively generates a new image at 24 times per second (24 Fps) can be synchronized and parallel processed to show a changed visual at 60 times a second (temporal upsampling) or have its pixel density increased to an 8K source (spatial upsampling). If presenting the three-dimensional simulation at 8K requires more processing resources than is available, then the 3D simulation may only be updated at 12 times per second, but the quality will be high, whereas at 60 times per second the quality might be low, but the image is highly interactive. The synchronization system for parallel processing (Maestro™) automates the tuning of controls for visual, audio, physics-simulation, or other sensory and/or calculation based services. Traditionally, simulations, video games, and general operating systems have controls that computer-savvy users can to tweak to achieve desired results. Applying such preferences to a range of sensory phenomena can become a challenge, especially if the user wants different tradeoffs in different areas, such as crisp but slow-updating text compared to smooth but fast-updated background visuals. Each element of a video stream (such as a sensory art bank of visuals spread across many screens, many sensory art banks of sounds across speakers, or various physics simulations across space time scenes) can be affected differently. This functionality can be exposed to users as areas-of-focus versus areas-of-less focus. For example, the window or region of visuals receiving active input can be identified as an area of focus while areas with no immediate user-driven changes can be identified as areas of less focus. The synchronization system for parallel processing can use estimates, scores, and course corrections to slowly tune features to keep user response rate, visuals update rate, sound fidelity, physics simulation precision, and general calculation precision in line as close to desired results as possible. In any scenario, a user can easily overwhelm the available computational resources by simulating too many physical collisions in one time step or by drawing too many details. The synchronization system for parallel processing can manage this excess demand for computational resources by turning down all tunable tradeoff options and/or pausing the generation of new content until further input is received. This can help preventing stalls or denial-of-service issues caused by the excess demand Overall the synchronization system for parallel processing (Maestro™) can function as a computational governor that helps manage user intent in real time to deliver the optimal experience for a given set of tasks and computational resources.

Probabilistic techniques to help determine the cores used, and therefore select where a task is executed. Probabilistic techniques can be used to help determine the instruction-sets initially chosen. The algorithm-units used to generate the actual instructions can rely on probability tables to choose the more likely outcomes. The methods used to assign a likelihood or probability that something may occur, and thus influence decision making, do not need to be coupled with the probability generating methods that produce random values to use in cryptography, visualization, math-solving (such as Monte Carlo solutions), and other approaches.

Given the range of transformations available for personal media, whether signal-based such as photos, music, home movies or record-based such as calendars, contacts, documents, spreadsheets, and other notes or databases, embodiments of the present invention can be used to organize one's life history and future decision making. This does not need to be done in an artificially intelligent (AI) way that suggests choices to make but as an extension of one's own thinking that reveals connections to relevant data, conflicts regarding resources, past intentions, and other patterns that are easy for the systems and methods described here to detect and reveal in dialog. Specifically creating presentations, in a four-dimensional space could suit desktop movies, slide shows, and/or simulations or virtual-reality experiences. Employing visualization, audio, and synergy to provide a back and forth dialog to find what the user seeks and expose what is possible, can open up a class of software interface that eclipses the common AI-gives answers model that has prevailed in most visions of next-generation software.

Separately, and perhaps more specifically, the systems and methods described allow for visual object of interest (i.e. visual element or any other kind of signal element) extraction, alteration, and sharing. An example of this would be pulling a picture of your grandmother out of an old home movie and placing this picture into modern film or video game, with properly seamed lighting, pixel density, and visual quality.

2. Detailed Description of the Figures.

Referring now to the figures, FIG. 1 illustrates an adaptable multiprocessor computing system and method that can be part of Essence™. Referring to FIG. 1 the system and method starts when a user 100 instructs the system by generating natural language instructions 102 or reissuing previous instructions that have been stored in the system 104. Natural language instructions 102 are processed by a natural language dialog interface 110 called Synergy™, described further in other parts of this disclosure. This natural language dialog interface 110 works with an dictionary, thesaurus, and/or stored history 112 to help understand the natural language instructions 102 provided by the user 100. If, after reviewing the dictionary/thesaurus/stored history 112, the instructions are not clear 114, the natural language dialog interface 110 will ask clarifying questions 116 to the user 100. These clarifying questions 116 can be in the form of a series of candidates for possible instructions, if such a list of candidate instructions is available. In all cases, it is desired to make the process as simple as possible for the user and to express the meaning back to the natural language dialog interface (Synergy™) 110 using terms and clauses Synergy™ already knows. Based on this input 102, the natural language dialog interface 110 sends the resulting code to a machine expressed human language (Grok Units™) generator 120.

The machine expressed human language (Grok Units™) generator 120 in FIG. 1 takes semantic units from the natural language dialog interface (Synergy™) 110 as inputs and translates them into instructions for the computer language output format generator (Elixir™) 130. Grok Units™ are the tools that Synergy™ 110 uses to translate between a user's language/dialect/chat-style and Elixir™ 130. Grok Units™ provide functions similar to existing lexical engines, such as WordNet. Grok Units™ generation 120 can use any of the following:

(a) Text Algorithms such as the Aho-Corasick,
(b) String matching to determine similarities of words,
(c) Burkhard-Keller trees to build matches, and
(d) Levenshtein Automata to determine the distance between a possibly misspelled word and its most likely candidates.

Regarding the thesaurus 112 in FIG. 1, the system and method can be configured to use a public domain thesaurus such as Roget's 1911 Thesaurus for English and a similar source for Japanese. The system and method can support YAML, Markdown, limited JSON, CSV, and limited XML formats for a thesaurus.

Grok Units™ exist to help the user get out of the computer exactly what he/she wants. Instead of hunting for apps, plug-ins or scripts that may accomplish what the user wants, the user can describe it, and the system will build that function for the user in real time. It will then store this information as a Grok Unit™ for the user to use or edit later. The system can also capture Beliefs (Blfs), which are tuple associations of data input by the user that either are direct data entry using a template such as "A is/was/will-be X", or those that do not match any templates well enough to be considered valid. These Blfs are considered unstructured data and can be exported as documents or NoSQL databases if the user needs. The system can start with 814 clause templates, based on notes already in the system, Design Doc, Journals, To-do lists, Idea data, and Origin Text. These are templates like "make x", "Change a to b", "give a to b", "C gives a to b", "distance X", (which includes is near, far, on, touching, intersecting, inside, etc), "tell x about y using z", etc. Each template clause replaces nouns, verbs, and most importantly prepositions or glue words to create the functioning template that selects the appropriate snippet of Qcode™. There can be many Grok Units™ based on history. Simple processing of what the user previously said scored by relevance to this context (how many similar ideas are in use), age, and frequency all provide analysis data used to determine how likely a match has been made.

Further referring to FIG. 1, Elixir™ 130 is an AI language translator. The Elixir™ language is the reductionist unit of representing human messages as a series of possible meanings paired probabilities of certainty. Elixir™ 130 is how the system can store any imported data, whether from a live human, an existing database, document, or web page, or objects and attributes extracted from signal media such as sounds, images, movies, three-dimensional scans, etc. Through use of Elixir™ 130, Synergy™ 110 is a mechanical solution that can deliver sustainable, predictable, controllable results.

Synergy™ 110 allows and encourages exclamations, which are reduced as best as possible to Elixir™ 130. The reason for this is to collect data for the user's experience, which can in turn be used for additional feedback, analytics, and even to complete older, ongoing user tasks. This may need a better understanding of condition 'y' for that particular user, but that is incrementally obtainable if Synergy™ 110 is recording all inputs. We want the user 100 to feel heard, to express as much information to us as they are comfortable doing, and to be able to use that information to help them better succeed at using the system to meet their goals.

Once the code stream has been formatted in Elixer™ 130, it is transformed into lock-less algorithmic units in a module called Morpheus™ 140. Morpheus™ is a real time code manager module 140 that receives code in the form of the auto-generated adaptive computer code used internally in the system and generates 100% parallel machine instructions 142 along with certificate schedules 144, and thread schedule 146. Morpheus™ focuses on transforming existing programming jobs into tiny algorithmic-units, such as identifying a search pattern, a math formula, a file seek/read, or a reordering of data. Each of these units can be expressed in different code templates that produce different machine instructions. Each of these instruction bundles can be profiled for timing/energy/resource use and separated to run on different CPU/GPU cores based on scheduling access to changes in data. While some workloads intrinsically have a serial nature, such as purchasing goods or banking transactions, the latencies of reading caches, disk I/O, network packets, and other events make it possible to split up work for better performance in many cases. Common examples, besides parallel tasks like rendering pictures, sounds or shapes, include searching for data-patterns and sorting their results, running a math formula or logic-decisions over a container of data, synchronizing precisely-timed changes amongst machines, and other simulations. Morpheus™ is about minimizing the serial nature of tasks and maximizing the scaling per core as described by Amdahl. The approach that can be used in embodiments of the present invention is to use a transform that allows all cores to continuously run (or go to sleep if idle) by transforming workloads into algorithmic units and scheduling their instructions across the available computing processors. While some tasks inherently have delays, stalls, or bottlenecks, this approach maximizes performance with self-profiling and avoids the semaphore/mutex/locking mechanisms using scheduling. It is true and independently verifiable that the system and method can be configured to run all tasks on all selected cores. It is also true that everything in the system and method can run completely parallel in that there are no locks, only scheduled changes to blocks of data that do not overlap. It can be the case that tasks such as file or network I/O take long periods of time while waiting, but embodiments of the system and method can be configured to not block or lock them out. The system or method can always run a single thread (or sometimes two) that is required by all operating systems to act as a message queue, and that thread is indeed serial. It simply has to be by definition for Windows, OSX (MacOS), Android, iOS, Linux, etc. Embodiments of the system and method can be configured to generate 100% parallel instructions. In order to achieve these results the complex challenges of lockless programming must be addressed during the code generation process. Lockless programming is a set of techniques for safely manipulating shared data without using locks. Locks are used to avoid contention, stalls and other conditions that result in latency and system crashes. Morpheus™ is a critical part of this approach. Morpheus™ can be configured to allow the system or method to issue certificates for each instruction without locks. Instead of placing the burden on coders, Morpheus manages certificates automatically. This allows the system or method to efficiently process enormous amounts of data and calculations. Morpheus enables the simultaneous creation of multiple worlds involving many representations of data and code behaviors without duplication.

Further referring to FIG. 1, the 100% parallel machine instructions 142, certificate schedules 144, and thread schedules 146 can then be processed by an adaptive Pcode™/Qcode™ generator 150. The adaptive Pcode™/Qcode™ generator 150 also receives machine status updates from the synchronization system for parallel processing (Maestro™) 160 to build the most optimal code for the specific machine in its current situation. The adaptive Pcode™/Qcode™ generator 150 continuously auto-generates adaptive computer code (Qcode™ and/or Pcode™) that is auto-tuned, auto-scaled, and auto-synchronized 100%-parallelized code for management of parallel processors 190 (multi-core CPUs and GPUs, memory, storage, I/O, power resources, and other services). Services self-assemble and cooperate, measure, and balance themselves in real time as a software product. The adaptive Pcode™/Qcode™ generator 150 automatically finds the optimal code profile for maximum speedup without the need for a team of engineers conducting expensive code optimization. Adding more processors does not provide the greatest improvement in performance. It is eliminating serial code and detecting other limiting factors such as I/O bottlenecks at runtime that makes the key difference. This advance can increase CPU processing speed by over 100× on a single machine with 12 cores, compared to 99.9× speed up potential on a server farm with 100 thousand cores. Our test results using an unmodified 2011 MacPro resulted in the reduction of processing time from 32 minutes down to 18.8 seconds. Embodiments of the present invention have established benchmarks on this machine that allows 1.2 million polygons to be rendered on 6 different displays simultaneously. Compare this with a typical military grade simulation-rendering engine, which manages only 20,000 polygons on a single display. The adaptive Pcode™/Qcode™ generator 150 manages code generation from natural language phrases for tuning, synchronizing, and scaling of resources. The adaptive Pcode™/Qcode™ generator 150 can use the following approach to parallelism:

1. Each task is evaluated according to:
   a. Memory latency/read vs. write (caches, bandwidth, and stalls)
   b. Multiple fetches (scatter/gather calls, GPU samplers)
   c. Atomic operations
   d. Instruction cycles, pipeline ordering, and i-cache size
2. Processors capabilities are assessed by:
   a. Vector Instructions
   b. Threading on single core (hyper threading)
   c. Simultaneous core operations (true parallel execution)
   d. Clock speed
3. Code generation undergoes a complex process of:
   a. Adapting existing tasks to best take advantage of today's hardware (how easy to map a task to parallel, within rules of Amdahl's law, and balance it)
   b. Ease of thinking in parallel with serial thinking, background, and mindsets
   c. Language infrastructure challenges of writing single CPU C++ code vs. multi-threaded vs. using vector instructions (SSE)

Further referring to the adaptive Pcode™/Qcode™ generator 150 in FIG. 1, optimal use of each of these factors allows us to combine a series of speedups, for example: 4× vector instruction, 16× threads, 4× memory read speed, ½ core clock speed slower, 8× samples per read fetch (using texture samplers)=1024× increase from a similar C++ code running on a standard CPU of double clock speed of a GPU. Scaling involves installing additional (optionally low-cost) hardware in the host system or installing a small application on candidate multi-function nodes (Smart phones, tablets, PCs, Workstations, Servers, game consoles, and an increasing array of devices) on a LAN, WAN, directly, or on the Internet to create an Adaptive Cloud Service (which includes the dynamic creation of a Micro Cloud).

Figure 2:
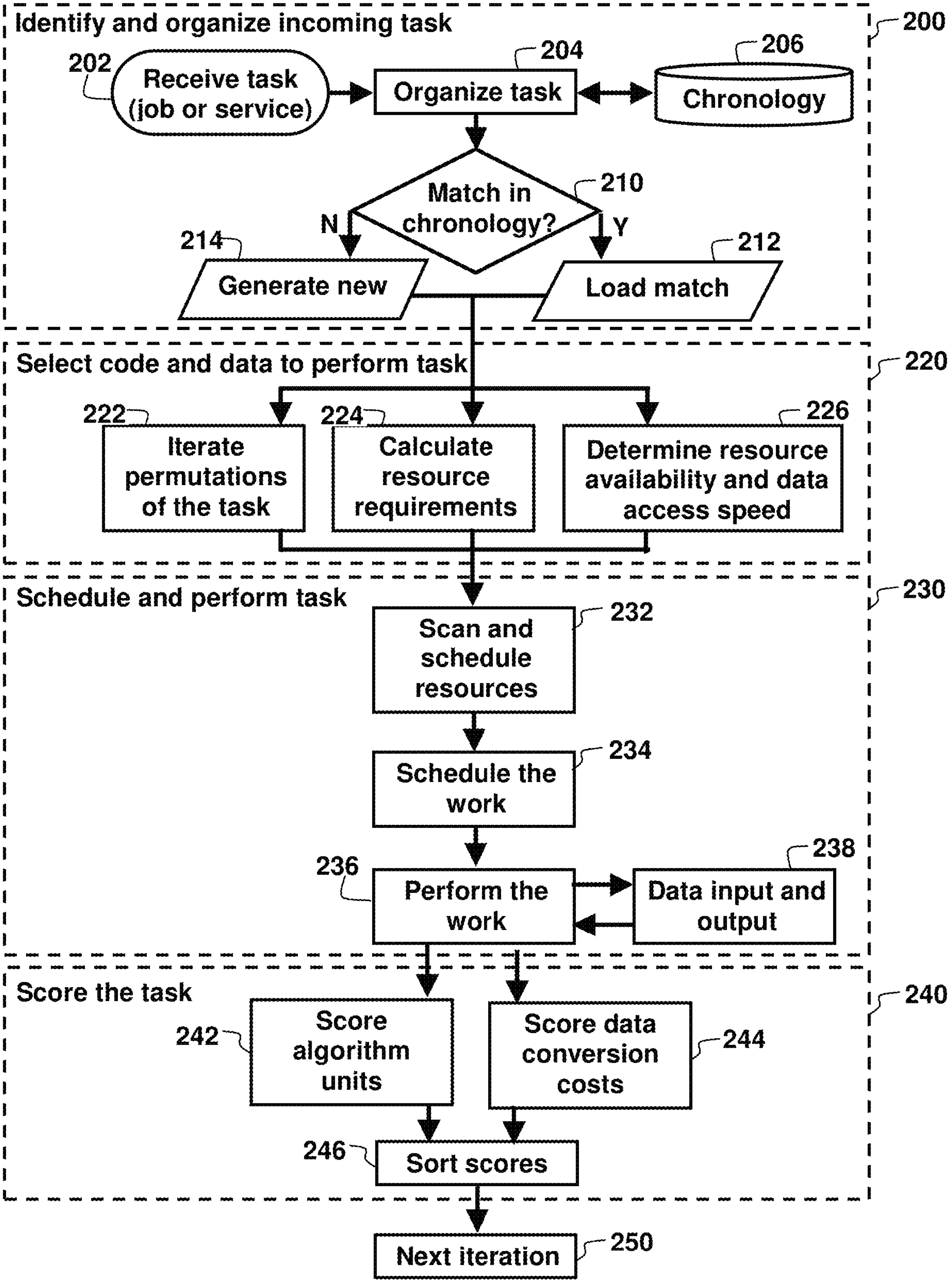
FIG. 2 shows elements of an adaptive computer code generator.

FIG. 2 illustrates a process for transforming workloads (i.e. computer code to be processed) into algorithmic units and organizing the algorithmic units for processing in parallel on multiple processors. The process shown in FIG. 2 encompasses the items shown as steps/modules at 140, 142, 144, 146, 150, and 160 in FIG. 1. Referring to FIG. 2, Elixir™ first identifies and organizes incoming tasks 200 in a series of steps shown at 202, 204, 210, 212, and 214 using a database called Chronology. This process begins by receiving an incoming task 202. Incoming tasks could be user requested tasks (also known as jobs) or system requested tasks (also known as services). Tasks are organized 204 by using a fast-access task chronology database 206. In one embodiment, the task chronology database 206 is structured with a table for each recipe-of-tasks, a row in this table for each task permutation, and columns for each data class. For any "recipe" or request of services, there are usually one or more tasks. These tasks can be understood as a Recipe when grouped together in such a table. Each task acts like a row in that table which has the info needed to run the task with specific data and evaluate the progress and results. A 'work record' can be replaced with "the database row containing a scheduled task (code & times), associated context (data & format), and any configuration details governing them (duration estimate, authorization). The organization of data classes can be broken down into:

(a) size to be processed (small, medium, large, etc);
(b) data width per unit; and
(c) destination of processing, such as USB to RAM, RAM to RAM, VRAM to SSD, etc.

Each job or service and the associated requested data set are processed into a signature that is looked up in the work record in the task chronology database 206. A signature is simple a universally unique identifier generated by the above "recipe" using bits from the task, the data description, and the configuration. A "work record" is a database table that covers all the permutations (using the Signature aka 'unique ID' mentioned above) of a task, data, and configuration, storing one permutation per row. Work Records are kept to improve future iterations of similar tasks. If the task chronology database lookup 210 generates a match, the details of that table are loaded 212 and a new row is added to the work record for this run. If the task chronology database lookup 210 does not generate a match, the system generates a new work 214 record based on the closest details or based on defaults, and adds a new run.

Next, the system selects code and data to perform the task 220, as shown by parallel steps 222, 224, and 226. Iterating permutations of the task 222 includes permuting algorithm templates (such as sort, find, compute, visualize, etc), permuting algorithm units (such as quick-sort, merge-sort, bionic-sort, etc) and permuting instruction packets (such as move, add, and jump). Iterating permutation of the task 222 can be done by cycling the templates, units, and instruction packets by using a Hilbert curve—a zigzagging between small changes that represent instruction packets and large changes that represent template types. This can maximize the distribution of optimal results in a manner analogous to a Monte Carlo approach to finding an optimal solution instead of brute force iteration of all possibilities.

Further referring to FIG. 2, the system calculates resources 224. Each task has a resource requirement determined by the data-structure describing each of the algorithmic units chosen. For example, if the system is performing a dynamics calculation, it might require scratch space of 16 floats per entity of mass and 2K of space for stepping through the data. A different algorithm is likely to use a different amount of temporary data but retain it from compute-step to compute-step until a new iteration cannot use any temp data from a previous iteration, which usually happens each time we change algorithmic template.

The system also determines resource availability and data access speed 226. This can (a) past measures such as bytes/second read from a source like RAM or SSD or an USB class device, (b) pending tasks via querying the local peer scheduler who may need to check with other peers, and (c) recent scores in the task-table.

Next, the system schedules and performs the task 230 as shown by steps 232, 234, 236 and 238. The first step in this block is to scan schedule resources 232, which involves scanning available space for temporaries, changes in sizes of data sets used, or for data to be loaded to compute start times. Then the work is scheduled 234. This step can include coordinating with peer nodes that may propagate to other peers the exchange and scheduling of the work. Scheduling the work 234 makes it available to neighbor parallel nodes who in turn may take or propagate the task to peers, etc. Then, standard computation occurs as shown at 236 and 238. This standard computation 236 may include reads and writes 238 devices, storage of data, and calculations per chip involved.

After the work has been performed, the system can score the process 240, as shown by steps 242, 244, and 246. Scoring of algorithm units 242 can be based on timing and power consumption. There can be a variable called current_time that reads a time stamp counter at the beginning and the end of the process (such as RTDSC for intel x86 chips) and updates values in the work-records row. The system can mix these time values based on the estimated time to complete the task, such as new_time=0.15*current_time+0.85*old_time. The system also needs to 244 score the cost of converting a data stream from the format it's stored in after decryption and decompression, to another format, as required by an algorithmic template. For example, GPS (global positioning system) information could be stored as latitude, longitude, and elevation. If the task is to find the shortest path traveling through all locations (the Traveling Salesman Problem), the system might need for latitude, longitude, and elevation to be converted to X, Y, Z values stored in memory. So while the performance of the algorithm template is scored, and each algorithmic unit and variant of instructions to implement those units, we also score the cost in terms of time and power (watts, if available) for converting the data. Generally, the code to convert is packed along with the rest of the algorithm approach when Qcode is generated so the only effort required is to put time-stamp-readers into that code and collect results later.

Once algorithm units 242 and data conversion costs 244 have been scored, these scores can be sorted 244. Each work-record task-recipe-table has ordered lists that keep scores and times ready for an ordered walk. These ordered lists are governed by this same mechanism. They use Algorithm_Template Ordered_List, which may choose from singly-linked-list, red-black-tree, AVL tree, btree, and others, and then algorithmic units such as pointer-walk, stack-address, aligned-pointer-recycling, each with many instruction packets such as x86 clusters of compare and move, or swap and copy, etc. that are different techniques of getting the same results.

Figure 3:
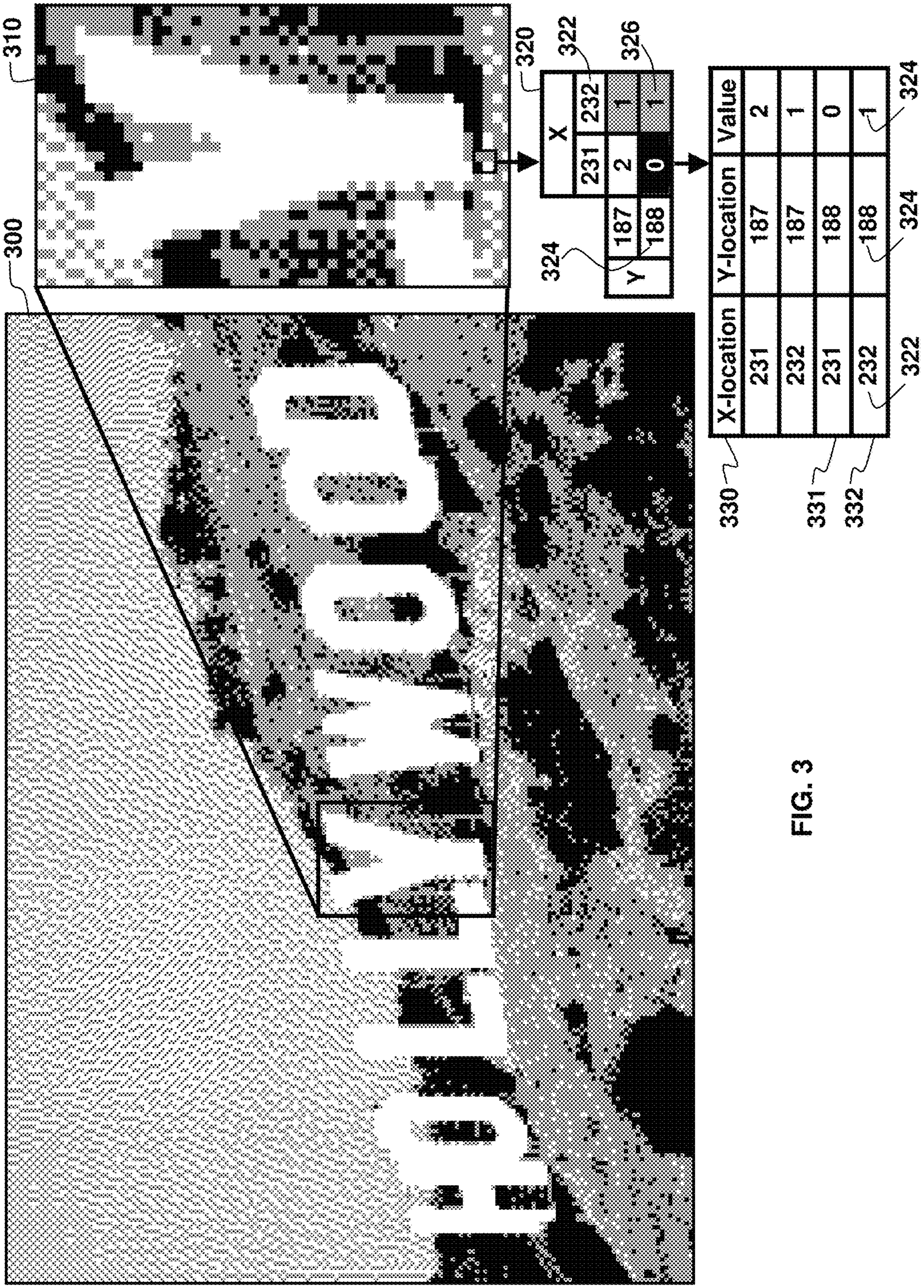
FIG. 3 shows a sample image.

FIG. 3 illustrates a sample image 300 for which pixel density enhancement is desired. To simplify the description and aid in graphic reproduction of FIG. 3, the image 300 is a dithered blown-up gray scale image having only three possible values for each pixel—black, white, and gray. Actual embodiments of the present invention can use initial images that (a) have a higher or lower initial pixel density, (b) have a higher or lower dynamic range (bits per pixel), (c) are in color, (d) could have more than two spatial dimensions, and (e) could also be moving images. Actual images or other types of signals to be processed by embodiments of the present invention can have any level of detail as measured by image resolution, pixel density, sampling rate, etc. Actual images or other types of signals to be processed can also have many more possible values for each pixel (dynamic range). For example, a typical gray scale image has 8 bits (256 possible values) per pixel and a typical color image has 24 bits (8 bits for each of three colors) per pixel. The image could also be a three-dimensional image that has depth as well as the X and Y dimensions shown in the sample 300. The image could also be a moving image that has a plurality of two or three-dimensional frames that change with time. The signal could be an audio file.

Further referring to FIG. 3, an image portion 310 has been provided to more clearly show the individual pixels of the sample image 300. In this example, the image portion 310 is the letter "Y" in the Hollywood billboard. A small piece of the image portion is shown in the pixel information grid 320 that illustrates how each pixel can be assigned an X-location 322, a Y-location 324, and a value 326. In this simple example, the pixel value shown at 326 represents the brightness of a pixel from a choice of three brightnesses, with 0 meaning black, 1 meaning gray, and 2 meaning white. The pixel information grid 320 can be converted to a pixel information table 330 that comprises pixel information records, shown at 331 and 332. A pixel information record 322 in a pixel information table can store the pixel X-location 324, pixel Y-location 326, and pixel value 328 information for a pixel in the sample image 300. The pixel information table 330 can more generally be thought of as an input signal definition table that provides the information received from an input digital signal. It should be noted that the data shown at 330 could be stored in a computer memory. The data shown at 330 could have come from data that has been decompressed from data that had been received from compressed data created from using any loss-less or lossy data compression technique capable of being understood by anyone skilled in the art. Such techniques can include, but are not limited to run length coding, Huffman coding, discrete cosine transforms, and dictionary lookups used in static and moving image encoding formats such as GIF, JPG, PNG, MPEG, etc.

FIG. 4 provides a simplified overview of how a quaternion-logarithm-based signal processing system and method can be applied to an image, such as the portion 310 of FIG. 3. More generally, the quaternion-based signal processing system and method (illumin8™) can be configured to receive digital data streams and improve the detail of the digital input signals to the highest quality of the hardware available. This system and method can process signal fields, such as sound files, pictures, or videos, and repackage them for greater efficiency and optimal quality. For example, standard definition video can be transformed to high definition, ultra high definition (i.e. 4K), or even higher pixel densities in real time. The process shown in FIG. 4 can be used to extract visual elements from a scene based on an object connection threshold. This means that the same scene, such as the Hollywood sign, 300 in FIG. 3, is able to produce a ten-element set with eight letters, a mountain and a sky or a two-element set with a word and backdrop or a 500 element set with edge clusters and bush blobs. A colored image can be segmented into object shapes using edge-detection, gradient-slope-calculations, and pattern-matches using gradients and finding tiling, granularity-changes (perspective), and other repeatables.

As an overview, the process shown in FIG. 4 begins with a digital input signal that has been stored in an input signal definition table 330 as pixel information records, such as 331 and 332. The information records comprise x-location, y-location, and value information (amplitude) for pixels in a Cartesian coordinate space. The input signal definition table can be used to compute gradient information 410, which can be converted to quaternions 430. The logarithm of these quaternions can then be calculated 440. The gradient information 410, quaternions 430, and quaternion logarithms 440 for a pixel in an image 400 is calculated by comparing the value of that pixel with the values of the neighbors of this pixel. Each of steps 410, 430, and 440 will be further explained later in this disclosure. The results of the gradient and quaternion calculations 410, 430, and 440 depend upon the size of the neighborhood in which calculations 410, 430, and 440 are made. This neighborhood size (N-size) can be used in conjunction with output of the quaternion logarithm calculation 440 to describe the strength and orientation of the amplitude gradient for a pixel and its neighborhood. For an input signal having two dimensions (x-location and y-location for example), a quaternion logarithm calculation can generate three outputs, which can be converted to a gradient strength and a gradient orientation. This gradient strength and gradient orientation are the "a" and "b" values shown in the quaternion logarithm records 450. The quaternion logarithm records 450 can be temporary records that can be generated on demand from the input signal definition table. The quaternion logarithm records 450 can be calculated for higher N-size values for those regions of the input signal (or image map) where the first and second order gradients show the greatest amount of change (i.e. have the greatest information content or the highest gradient values). The information in the quaternion logarithm records 450 could be used to construct a gradient map 452, which is shown superimposed over the image portion 310. The information in these pixel quaternion logarithm records could also be used to create a fuzzy mapping of the image values at a higher level of detail than the original rasterized image portion 310. By using a piecewise polynomial curve fit 460, this information in the quaternion logarithm records 450 could be used to upsample (i.e. interpolate between points or pixels in the original sample) to produce an output signal definition table 470 that can produce an image having a higher pixel density 472 (i.e. finer detail) than the input signal. The image shown at 490 illustrates the jagged edges that result when a gradient direction vector is not taken into account when upsampling an image. Many prior art upsampling systems and methods produce results similar to 490 instead of results similar to 472 that can be produced by embodiments of the present invention using the system and method described herein. Another way of understanding the benefits of the log quaternion-based process described herein is that the shape of the features of the original scene can be captured because the two quaternion values (a and b) capture the gradient vector direction at every point in the originally sampled waveform, (i.e. image or other data).

Figure 5:
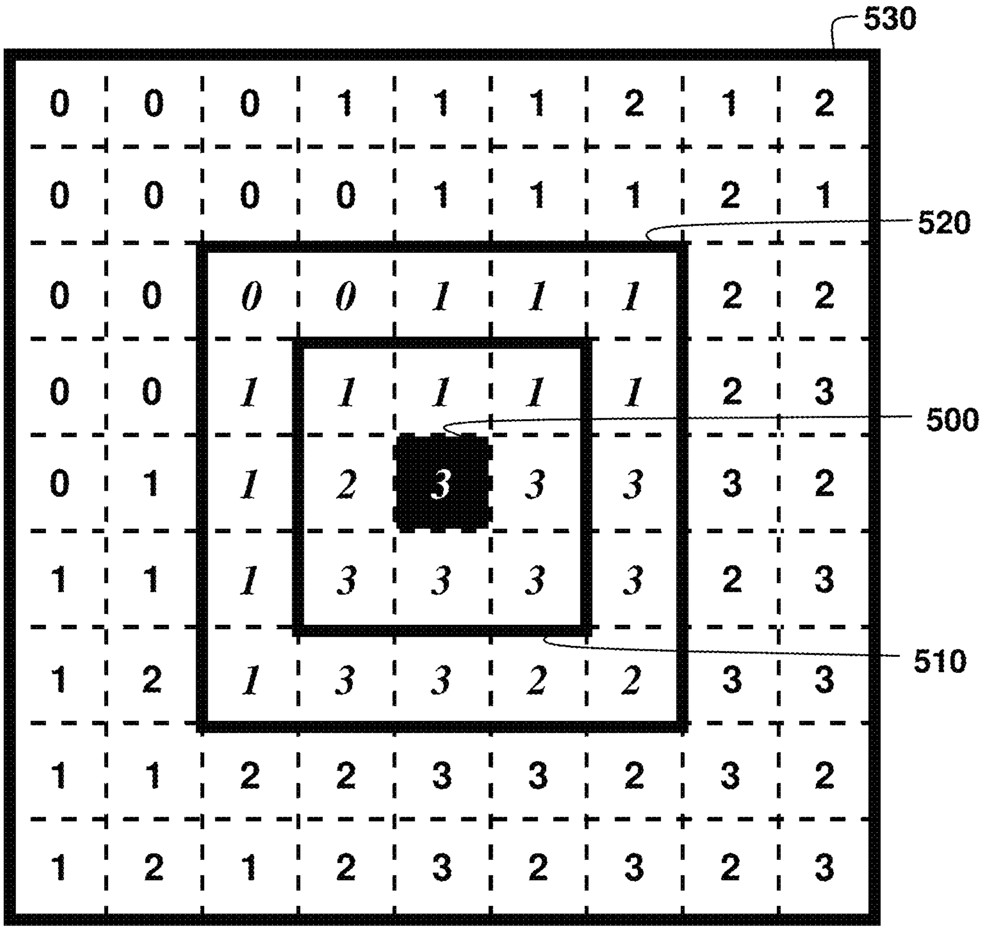
FIG. 5 shows pixel neighborhoods of size 1, 2 and 4.

FIG. 5 illustrates pixel neighborhoods of size=1 (at 510), size=2 (at 520), and size=4 (at 530). The size 1 neighborhood shown at 510 has 9 pixel elements in a 3×3 square grid. The size 2 neighborhood shown at 520 has 25 elements in a 5×5 square grid. The size 4 neighborhood shown at 530 has 81 pixel elements in a 9×9 square grid. As shown by FIG. 5, the neighborhood size (referred to as N-size) can be defined as the maximum number of increments (or steps) that a pixel within the neighborhood can be away from a center pixel 500. In embodiments of the present invention, the N-size can be any positive integer value, but that there can be computational benefits to picking N-sizes from the series 1, 2, 4, 8, 16, 32 . . . (i.e. powers of 2). When defining the boundaries of a pixel neighborhood, a step can be any of the following:

- One pixel vertically above the center pixel (0 in the x direction and +1 in the y direction);
- One pixel to the right of the center pixel and one pixel above the center pixel (+1 in the x direction and +1 in the y direction)
- One pixel horizontally to the right of the center pixel (+1 in the x direction and 0 in the y direction);
- One pixel to the right of the center pixel and one pixel below the center pixel (+1 in the x direction and −1 in the y direction)
- One pixel vertically below the center pixel (0 in the x direction and −1 in the y direction);
- One pixel to the left of the center pixel and one pixel below the center pixel (−1 in the x direction and −1 in the y direction)
- One pixel horizontally to the left of the center pixel (−1 in the x direction and 0 in the y direction); and
- One pixel to the left of the center pixel and one pixel above the center pixel (−1 in the x direction and +1 in the y direction).

Figure 6:
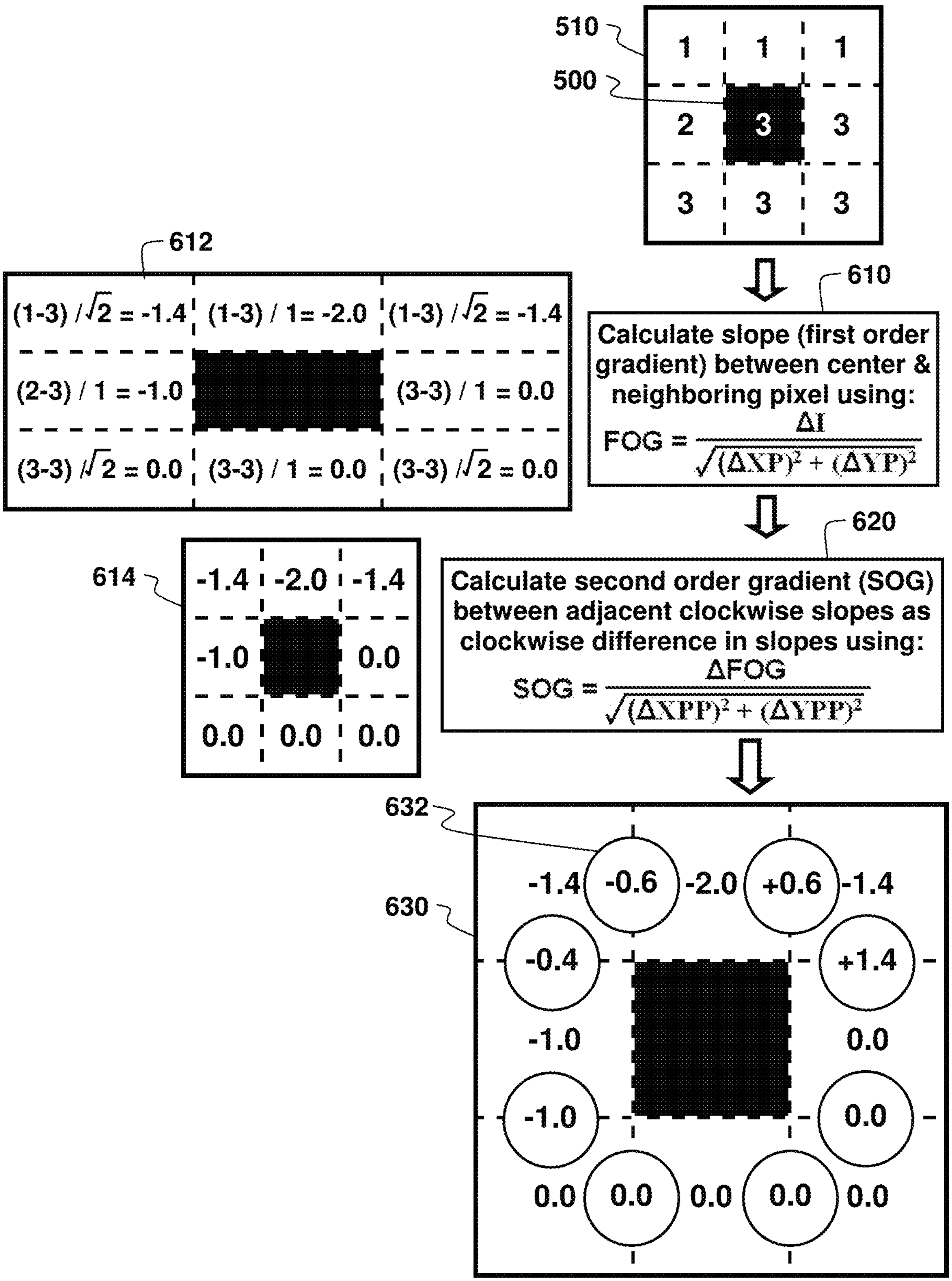
FIG. 6 shows a process and example calculation for computing first-order and second-order gradient sets from two-dimensional amplitude values.

FIG. 6 provides more detail of how step 410 in FIG. 4 can be performed in an embodiment of the present invention by illustrating a process and example for computing first and second order gradient information sets. This process operates on grids of values (or amplitudes) in the neighborhood of a central point. In one embodiment of the present invention the grid of values could be a two-dimensional pixel value (amplitude) neighborhood having size=1, as shown at 510. This N-size 1 neighborhood has a center pixel at 500. The first step of the process is to calculate the slope between the center pixel and all neighboring pixels in the neighborhood as shown at 610. In one embodiment, this is done using the following equation:

$$FOG = \frac{\Delta I}{\sqrt{(\Delta XP)^2 + (\Delta YP)^2}}$$

where:

FOG=the first-order gradient (or slope) value;

ΔI=the neighboring pixel value minus the center pixel value;

ΔXP=the neighboring pixel x-location minus the center pixel x-location; and

ΔYP=a neighboring pixel y-location minus the center pixel y-location.

An example of this first-order gradient calculation is shown in the equations shown at 612 for each element of the grid. Note that pixels that are diagonal to the center pixel are spaced at $\sqrt{2}$ units from the center pixel. The results of these equations, shown to one decimal place of precision, are shown at 614. Typically these values would be computed at much greater precision and they may also be normalized so that the maximum possible slope (i.e. first order gradient would be 1.0).

Further referring to FIG. 6, the first order gradients are then used to calculate the second order gradients 620. In one embodiment, the second order gradients are calculated using the following equation:

$$SOG = \frac{\Delta FOG}{\sqrt{(\Delta XPP)^2 + (\Delta YPP)^2}}$$

where:

SOG=a second-order gradient value;

ΔFOG=a difference in first order gradient values between a neighboring pixel and an adjacent neighboring pixel;

ΔXPP=a difference in x-locations between the neighboring pixel and the adjacent neighboring pixel; and ΔYPP=a difference in y-locations between the neighboring pixel and the adjacent neighboring pixel.

An example of this second-order gradient calculation, combined with the first order gradient values, is shown at 630. In 630, the first-order gradient values are shown as values in the center of each of the neighborhood cells around the central pixel. The second order gradients are shown in the circles between the first-order gradient values. As an example of how the second order gradient is calculated, one can look at the −0.6 that is shown at 632. This value represents the difference between −0.14 (clockwise to the left) and −2.0, to the right of the circle. The other values in the circle were computed in the same way. Note that one did not need to compute the distances between the cells since these are all the same as one walks around the circle of values in the circles.

Figure 7:
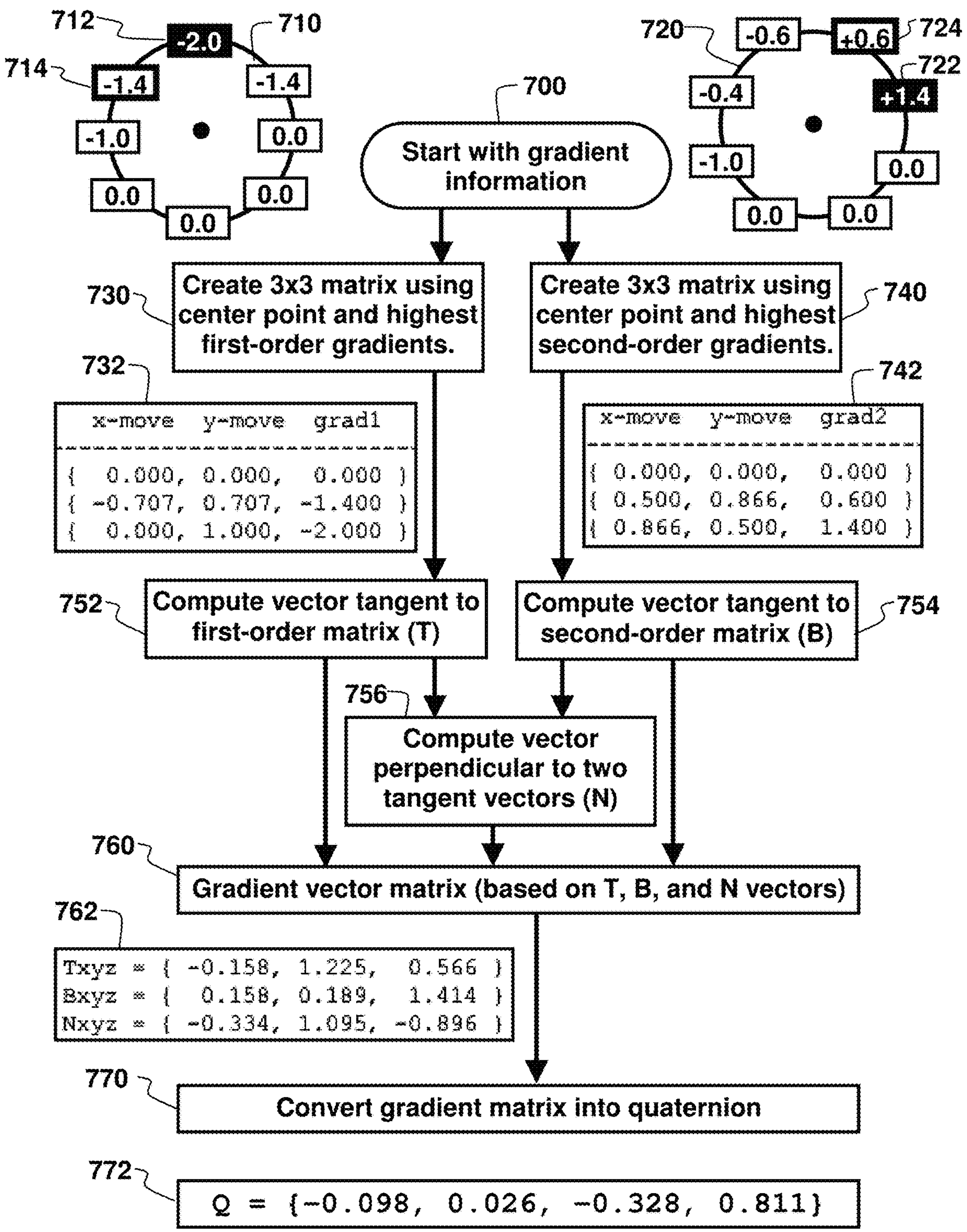
FIG. 7 shows a process and example calculation for converting a first-order and second-order gradient set to a quaternion.

FIG. 7 illustrates a method for converting a first and second order gradient set to a quaternion. This process begins with the previously calculated gradient information 700, more specifically results from the first-order and second order gradient calculations, such as the data shown at 630 in FIG. 6. For clarity, this sample gradient information has been reorganized into the first-order gradient information set 710 and a second order gradient set 720. By organizing these two sets 710 and 720 as wheels, it is easier to visualize how the next steps are performed.

Next, embodiments of the present invention can select the highest first-order gradient 712 and the highest second order gradient 722. The highest first-order gradient 712 is the gradient in the set with the highest value. If two (or more) first-order gradients in the set have the same value and this value is the highest of the first-order gradients in the set, one of these two first-order gradients is chosen. The method for choosing the highest first-order gradient that will be used can be any method capable of being understood by anyone skilled in the art. In one embodiment, the highest first-order gradient chosen is determined from the relative positions of the first-order gradients. In this embodiment, the gradients can first be sorted based on horizontal (x-direction) position with preference given to gradients that are located further to the right (having a greater x-position). If this still results in ties having the same first-order gradient value, the gradient that has the highest y-position is chosen. Similarly, the highest second-order gradient 722 is the gradient in the set with the highest value. If two second-order gradients in the set have the identical highest value the second-order gradient to use can be determined using the same methodology as was described for choosing the first-order gradient.

Then, the values adjacent to the highest-first order gradient are compared and the higher of these two values 714 is selected. If the two adjacent first-order gradients have the same value, the value counterclockwise from the highest first-order gradient is selected. Similarly, the values adjacent to the highest-second order gradient are compared and the higher of these two values 724 is selected. If the two adjacent second-order gradients have the same value, the value counterclockwise from the highest second-order gradient is selected.

Information about highest first-order gradients, 712 and 714, can be combined with information about the center point to create a 3×3 matrix in the step shown at 730 and the example shown at 732. This matrix shows the x distance moved from the center point (labeled x-move) in the first column, the y distance moved from the center point in the second value and the slope in the third column. The values are shown in the following row order:

(a) The first row is for the center point (always 0, 0, 0);

(b) The second row is for the point on the circle that is furthest counterclockwise; and (c) the third row is for the third point.

This convention in choosing the points is done so that any vector cross product calculations will produce a result that is oriented in the same direction. The same approach and rules are used with the information about the highest second-order gradients 722 and 724 to create a 3×3 second order gradient matrix in the step shown at 740 and example calculation shown at 742. The x-move and y-move values in 732 and 742 are determined based on the circle in 710 and 720 having a radius of 1 unit. Thus, a value directly about the center pixel would have an x-move of 0 and a y-move of 1, as shown in the third line of the matrix at 732. A value diagonally up and to the left would have an x-move of −0.707 (half of the square root of 2) and a y-move of 0.707 (half of the square root of 2), as shown in the second line of the matrix at 732. Similarly the value shown at 722 is one half of a unit up from the center pixel, and half of the square root of three units (0.866 units) to the right of the center pixel, as described in the third line of 742.

The 3×3 first-order gradient matrix 732 and second order-gradient matrix 742 are then used to compute a first basis vector (T) in the step shown at 752 and a second basis vector (B) in the step shown at 754. These two vectors, T and B, can then be used to compute a vector N perpendicular to both T and B in the step shown at 756. These three vectors (T, B, and N) can be combined into a gradient vector matrix in the step shown at 760, which would result in the values shown at 762 for the input data provided at 732 and 734. This gradient matrix can then be converted to a quaternion in the step shown at 770, for which the results of the example are shown at 772.

FIG. 8 illustrates how a gradient vector matrix (762 in FIG. 7) can be calculated from the first-order the gradient matrix (732 in FIG. 7) and the second-order gradient matrix (742 in FIG. 7). This process can be described as a computation of two basis vectors (752 and 754 in FIG. 7) followed by the computation of a third basis vector that is normal to these first two basis vectors. The computational process uses the x-move and y-move data from the first-first order gradient matrix (732 in FIG. 7) and the x-move, y-move, and grad2 data from the second-order gradient matrix (742 in FIG. 7). The first basis vector (T) is computed from the y-move data in the first-order gradients matrix and all of the data in the second-order gradient matrix. The second basis vector is computed from the x-move data in the first-order gradient matrix and all of the data in the second-order gradient matrix. In both cases the magnitude of these vectors is also the difference of the products of the x-move and y-move information in the first-order gradient matrix as shown by the computation for r1. in FIG. 8. The third basis vector (N) is computed as the normal to the first and second basis vectors.

FIG. 9 illustrates how the gradient vector matrix can be converted into a quaternion and an example such a conversion. The computations shown in FIG. 9 are an example of what is computed in 770 of FIG. 7 to convert the example gradient matrix shown at 762 into the computed sample gradient shown at 772. Referring to FIG. 9:

(a) Trace is used to test for the possibility of singularities and to calculate the magnitude Q[3]=Q.w of the quaternion.

(b) A perfectly oriented unit matrix would have 1+1+1 on diagonal, zeros everywhere else, and Q.w would be 1. Perfectly oriented, in this case, means a rotation matrix that exactly aligns with the X, Y, and Z axes.

(c) Q.x is the deviation from a perfectly oriented matrix in one rotation.

(d) Q.y is the deviation from a perfectly oriented matrix in a second rotation.

(e) Q.z is the deviation from a perfectly oriented matrix in a third rotation.

(f) Trace is the sum of the diagonal components of the gradient matrix that was computed at step 760 of FIG. 7. The diagonal of this matrix is the first element (x) of the first row, the second element (y) of the second row, and the third element (z) of the third row).

(g) If Trace is zero, there is an alternate and computationally slower (because it requires more steps) method for converting to a quaternion. Thus, Trace serves as an "error handling" number in this case. This more computationally slower method is shown after the "else" in the pseudo code example.

FIG. 10A illustrates a first method for computing the logarithm of a quaternion. The method shown in FIG. 10A is based on he classical mathematical way of expressing the logarithmic operator in which:

(a) q is the quaternion (a hypercomplex number) that can be calculated using the system and method that were described with reference to FIG. 7, FIG. 8, and FIG. 9;

(b) s is the imaginary quaternion portion of q, which is represented by the first, second, and third terms in the sample quaternion that was calculated in FIG. 9;

(c) v is the real quaternion portion, which is represented by the fourth term Q.w;

(d) |q| is the length (or magnitude) of q;

(e) |v| is the length (or magnitude) of v (the real portion of q); and $$\text{(f) } \mathrm{Log}(q) = \left(\mathrm{Log}|q|,\ \frac{v}{|v|}\arccos\frac{s}{|q|}\right)$$

is the resulting equation.

FIG. 10B illustrates a second method for computing the logarithm of a quaternion by showing an example calculation for the quaternion that was calculated in FIG. 9. The example calculation shown in FIG. 10B computes a magnitude term (the variable labeled Magnitude) that is analogous to |q| in FIG. 10A. The example in FIG. 10B uses the inverse tangent (arctangent) instead of the inverse cosine (arccos) of FIG. 10A for ease of computation and because of the direction in which the computation is being performed (angle to Cartesian versus Cartesian to angle. The example in FIG. 10B uses arctangent to more directly convert from x, y Cartesian values to a single value for the angular deviation from a zero (aligned with the x-axis) angle.

Further referring to FIG. 10A and FIG. 10B in conjunction with the quaternion logarithm records shown at 450 in FIG. 4, the two quaternion logarithm values (a and b in 450 on FIG. 4) come from the quaternion logarithm calculations shown in FIG. 10A and FIG. 10B. More specifically:

(a) the first quaternion logarithm value (a) can thought of as a magnitude value that is responsive to Log|q| and/or the magnitude calculated in FIG. 10B; and (b) the second quaternion logarithm value (b) can be thought of as being responsive to an angle in the quaternion such as $$\frac{v}{|v|}\arccos\frac{s}{|q|}$$

in FIG. 10A and/or a combination of the three quaternion logarithm terms in FIG. 10B.

From a theoretical and conceptual perspective, the quaternion computations shown in FIG. 7, FIG. 8, FIG. 9. FIG. 10A and FIG. 10B are a way to find a signal value, such as a RGB color, PCM (pulse code modulated) wave point, or three-dimensional heat sample, given a spatial address and magnitude of detail where small magnitude returns fine details and high magnitude returns coarse. The field generated by this process forms a function that takes the appropriate one-dimensional, two-dimensional, or three-dimensional address and magnitude and returns the appropriately resample signal value. The function maps the address coordinates, magnitude, and the field's orientation matrix (stored as the logarithm of a quaternion to reduce components and allow for simpler math of non-uniform into a 'mix space' to derive the output sample for a given resolution. The address coordinates are analog (fractional, not discrete pixel or sample cells) and can provide an infinitely small or large variation, incorporating noise-functions or recursively sampling from itself to generate details. The quaternion log represents the second derivative between neighboring quaternions at all log resolutions of the original input source. When processing a two-dimensional image, the system and method can sample the 3×3×3 neighbors with x and y being in the two-dimensional source image space and z being in a resolution space of higher/lower. The system and method can iterate for each sample at each neighbor set to find the largest dot product of gradients between the source and its neighbors. It can then do the same process a second time amongst the gradients chosen but using the smallest dot product, which can be stored as a sparse array of non-rectangular samples, often at a far smaller resolution than any incoming image, depending on thresholds used for "similar enough".

The output of the quaternion logarithm function is a set of three values for each X-location and Y-location as shown at 450 in FIG. 4. The first of these additional values is the resolution at which the quaternion transformation was made. The second and third of these additional values are the two output parameters of the logarithmic quaternion function, labeled as a and b. In layman's terms, the two quaternion values (a and b) in conjunction with the resolution information provide a map of the direction and magnitude of the rate of change of the gradient vector (or gradient streams) of the value data (i.e. brightnesses or amplitudes or colors as shown at 326 in FIG. 3) of the pixels in the original image. The data shown in the table at 450 in FIG. 4 can be thought of as a five dimension space represented as sparse matrix (for space savings and cache access) that can be indexed via the original three dimensional quaternion log used to select a magnitude and level of object threshold and 2 values for a selection point in two dimensional space (the X and Y locations). Note that this data becomes a six-dimension space when processing data images that have an additional dimension (such as depth, or time in the case of moving images). It becomes a four-dimension space if we use a one-dimensional signal, such as one channel of sound.

The computation of gradient streams for an image allows embodiments of the present invention to preserve silhouettes and later present the image at different resolutions, depending on the level of detail desired. This not only helps preserve continuous edges, color bands, and textured patterns, but also eliminates the blocky visual chunks that reveal the underlying grid structure of all the pixels. The data used to upsample is the gradient "bit streams" of the image. In some ways, this is like turning pixel art into vectors, but is critically different. More specifically, in the embodiment illustrated in FIG. 4, the system does not remap a pixel grid into vectors. It continuously remaps the pixels of the object into gradient information, which is a spatially programmed ordering. Instead of following fixed steps like Zigzag encoding or Morton ordering, embodiments of the present invention can encode and compress the data with a mini program. To describe the direction of a step, the mini program uses 4-bit operation codes, signal-sample prediction, and changes to resolution-area. This allows larger and smaller areas to be predicted per step. The system and method can detect image features such as stair-step corners, T-edges, L-steps, etc. and up sample those features based on related features (as determined by hue, gamma, and curve-continuity), which comprise a visual scene. In this case, elements of the visual scene can be a superset of possible features, of which some are found in any single element of a scene. By detecting many mini features, the system and method can better choose up sampled details based on an object's or "feature composite's" details.

Figure 11A:
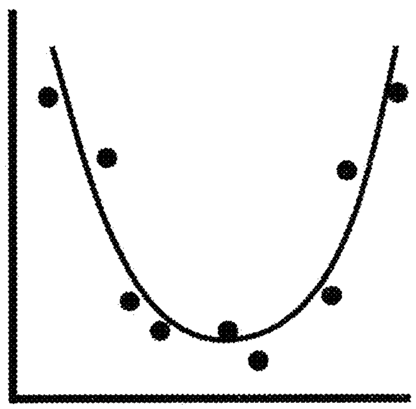
FIG. 11A shows an example of single variable quadratic regression.
Figure 11B:
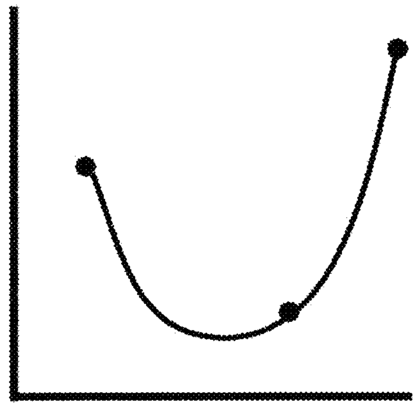
FIG. 11B shows an example of single variable quadratic interpolation.
Figure 11C:
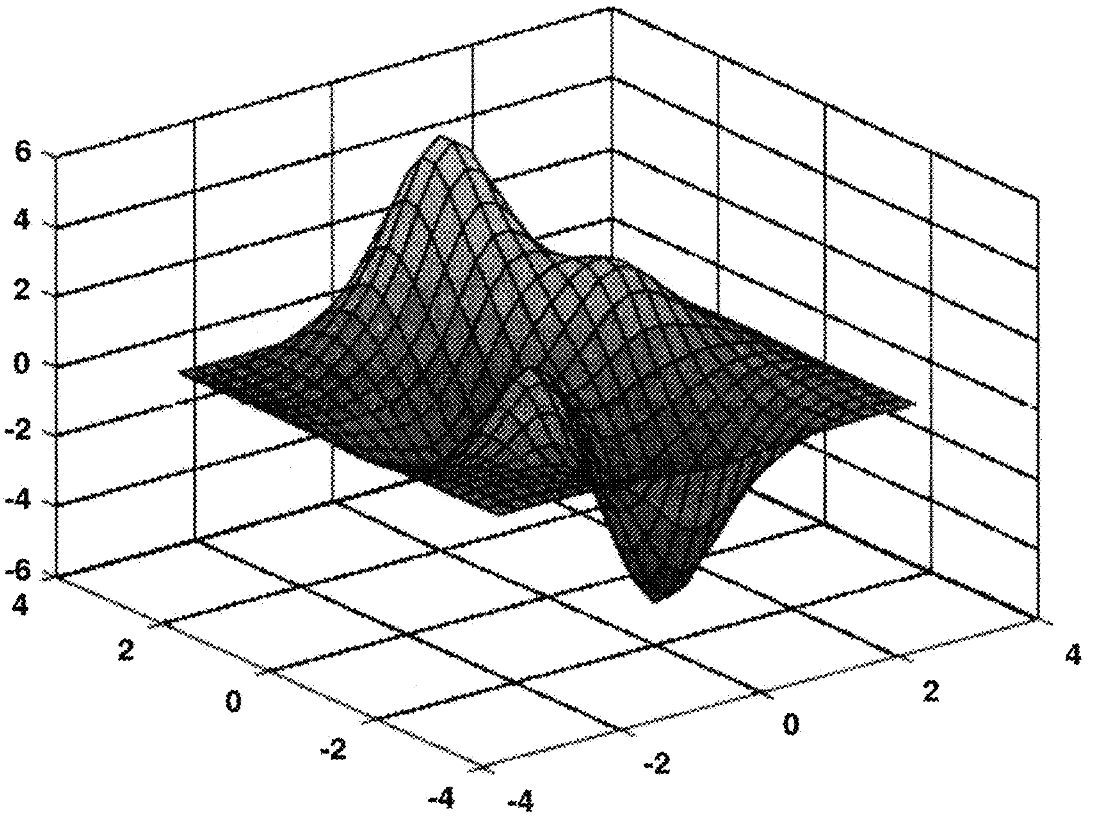
FIG. 11C shows an example of two variable cubic piecewise interpolation.

FIG. 11A, FIG. 11B, and FIG. 11C illustrate what is meant by upsampling using a piecewise polynomial curve fit as was mentioned at the step shown as 460 in FIG. 4. Upsampling means selecting points other than the original data points on a curve, surface, or higher order manifold. Piecewise, in this disclosure and the attached claims, means that the polynomial curve fit is done over a portion of the image (or other signal) data. The polynomial curve fit could be either a regression curve, such as the second-order (also called quadratic or second degree) single variable polynomial curve shown in FIG. 11A, or an interpolation, such as the second-order (i.e. quadratic or second-degree) interpolation shown in FIG. 11B. For a regression curve, the objective is to pass a line as close to the set of points as possible in a way that minimizes the root mean square of the distances from the data points to the curve. An interpolation line passes directly through the data points For a single variable polynomial, a regression curve can only be constructed if the number of data points is greater than one more than the degree of the polynomial and an interpolation assumes that there is exactly one more data point than the degree of a polynomial. The actual generation of the curve and use of the curve to generate data for additional (upsampled) points (using either linear regression or interpolation) can be done using any mathematical method capable of being understood by anyone skilled in the art.

For purposes of this disclosure and the attached claims, the concept of "curve fitting" can apply to more than one dimension (i.e. more than one variable in the function). For example, the curve could be a surface (two dimensions—two variables in the function), the curve could have even more dimensions. FIG. 11C shows a two variable surface that has a piecewise third-degree (also known as third order or cubic) polynomial fit to it. In embodiments of the present invention, the polynomial chosen can be a first degree ($x^1$), a second degree ($x^2$), a third degree ($x^3$), or higher degree polynomial equation. The polynomial can have one variable (a line), two variables (a surface), or more than two variables. The degree, number of variables, and size of the increments over which the polynomial is calculated could be in any combination. The degree, number of variables, and size of the increments over which the polynomial is calculated could vary from one part of the signal (such as an image signal) being processed. This variation in degree, number of variables, and/or size of the increments could depend upon the information content or other attributes of the data in different portions of the input signal (or the entire signal) that is being processed. One of the measures of information content can be the magnitude of the quaternion logarithm values. Embodiments of the present invention typically generate their curve fit using the quaternion logarithm data. If this data has been accurately calculated (i.e. using double precision computations, for example), there is minimal need to adjust the resulting interpolated output signal based on actual input signal amplitude values. However, if all data is gradient data, there is a need to have at least one anchor point value in order to ensure that the resulting curve fit data is tied back to an original input value (or amplitude) from some point in the input signal stream. If the data being used for the curve fit is less accurately calculated, it may be necessary to have more anchor points with which to adjust the output signal data.

Figure 12:
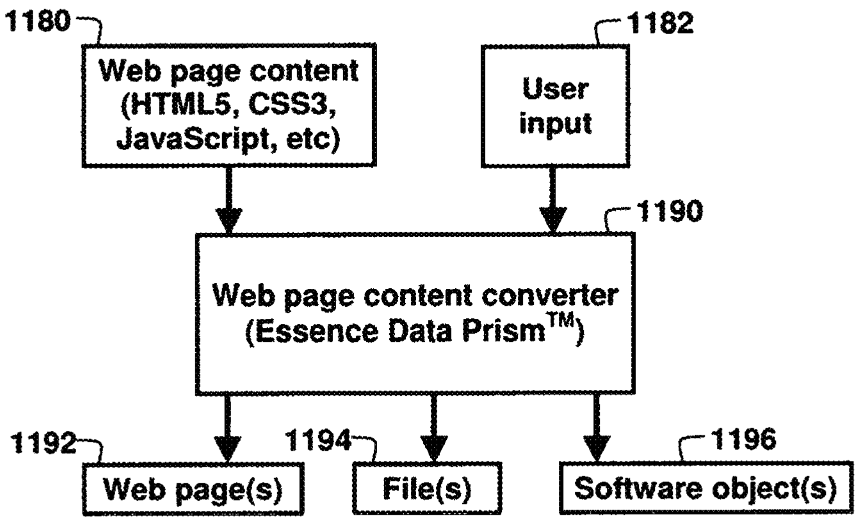
FIG. 12 shows a web page content converter (Essence Data Prism™)

FIG. 12 illustrates that the method and system described with reference to FIG. 3 and FIG. 4 can be implemented as a web page content converter (Essence Data Prism™). Referring to FIG. 12, the converter 1190 takes inputs from the internet 1180 and breaks them apart into software objects for compositing with other data streams, code and user input. This converter can also be a web browser. Like mainstream browsers (Internet Explorer, Chrome, Safari, Firefox, Opera, and the new Edge browser from Microsoft), Essence Data Prism™ is highly compliant with internet standards. This means websites based on HTML5, CSS3, JavaScript, Flash, and other web standards will work. The web page content converter 1190 can also receive user input 1182. The output of the web content converter 1190 can include web pages 1192, files 1194, and/or software objects 1196. It should be noted that the quaternion-based image resolution enhancement system and method (illumin8™) shown in FIG. 4 that is embedded into the web page content converter 1190 in FIG. 12 can process a broad variety of files, not just image files. Among the types of files that can be processed by the quaternion-based system can be: HTML files, CSS style sheets, JavaScript code, images, videos, sound files, text files, RSS feeds, PDFs, other kinds of computer code, third-party browser plugins and apps, user input, and many other types of computer-readable information.

3. Additional Embodiments and Features

Pcode™ vs Qcode™. The automatic computer code generator (Essence™) permits two complementary methods of generating software. The first of these is Qcode™, which is processor-native assembly code or driver protocol code, that is generated in real time, can be profiled, and regenerated to auto-tune optimal results for dynamic conditions (changing machine workload, energy, and operating modes) and changes in the data source used. Qcode™ was named "Quanta of Code" as various units of code, whether singular processor instructions, clusters of instructions, or algorithms using those clusters. Qcode™ is self contained and is prevented from accessing memory, devices, services, or other data sources outside of what was authorized prior to generating the Qcode™ itself. This approach targets efficiency, security, and parallel scheduling. Second is Pcode™, which stands for platform specific code that is fixed in nature and compliant with the operating system conventions on using a particular set of processors. While Qcode™ works with Intel's 80×86 or Nvidia's PTX instructions, Pcode™ works with Microsoft's Win64 model or Apple's Mach-O/Cocoa model. Pcode™ is built using platform specific tools such as compilers, assemblers, linkers, code signers, etc. Then each Pcode™ interface is tested by Essence™ for security, rules-compliance, and runtime resource-use and response times. Then Pcode™ is compressed, encrypted, and packaged so it can be loaded and later unloaded at runtime for rapid adding and removing of capabilities. This allows the system to using the code that's needed, potentially saving memory, virtual swap space, and/or battery life. It also allows the system to hot-swap features in and out, even replacing entire subsystems of functionality or allowing them to coexist simultaneously, such as Khronos' OpenGL and Apple's Metal or a WebKit based browser along with a Chromium one. Pcode™ can accelerate build times for Essence™ as Essence™ can be left running and only the Pcode™ that needs to be changed can be hot swapped. Having all code in Essence™ (boot-up stack, device drivers, and process scheduling, file formats, network services, and various database/social-media transactions) in Qcode™ has performance, security, portability, and flexibility benefits. Pcode™ is needed to be able to run on each platform's operating system model, API calling conventions, 3rd party libraries/SDKs, and the use of any private software that can be added after an Application has been installed. While Pcode™ and Qcode™ have different core features, they do both give behaviors to Essence™ and they both can be shared without any installation process, if the user has authorized access rights. It is possible to package Essence™ Cosms, filled with Qcode™ and Possibility Data, and 'Katos/Centurions/Powers', filled with Pcode™, inside of existing media formats such as JPEG, PNG, GIF, and MP3. Many other formats are possible. The value is the easy transfer and use of such media formats across emails, phone text messages (iMsg/MMS), social-media, thumb drives, etc. Since it's just a picture or song, it's easy to share, find, store. Since its Qcode™ or Pcode™, it won't run outside of Essence nor can it secretly or malevolently access the user's data without having been approved by the user to do so. Each interface describes a range of changes that are possible, so a user must approve, at least once, the access to a sense like a camera or microphone, or stored data, or other Qcode™/Pcode™ powers. Both approaches complement each other as means to empower Essence users to make the most of the computing resources they have with the most say in how it's done.

Blackbird Pi™ is a hardware and software combination for linear scaling of computational capabilities. Its design centers around a System on a Chip (SoC), housed in a snap-connectable module. Each Blackbird Pi™ can route both electrical power and network connectivity, via the ethernet protocol, to its neighbors. Each device can also support external protocols such as USB 3.0, Thunderbolt, or a proprietary connector for incoming video streams, sensors, or input devices. Depending on the configuration, Blackbird Pi™ modules can be snapped together linearly, with power and network entering at one end and progressively shared between all the nodes in between. This can allow stacking in two dimensions forming a wall, given top/bottom and left/right connectors, or a large volume 'box' using front/back connections as well. Using power over ethernet, via a modified Cat5 style wire, power can be distributed, potentially remove heat, which is critical in the volumetric three-dimensional stacking. It is also possible for an end user to create peer-connected clusters by snapping the Blackbird Pi™ modules together. The Essence™ Qcode™ makes this possible by being able to dynamically add and remove nodes, configure the clustering and route computing tasks, such as answering queries, rendering visuals, simulating physics, or solving equations. This method of computing relies on hardware that is neighbor aware, through its connections, and software that can regenerate/reorder both its code and its data.

Centurion™ is a method of approaching dynamically added or removed native code. Centurion™ can be used to connect external hardware (cameras, controllers, etc) or external services (websites, databases, or data formats). Centurion™ combines the security of the StreamWeaved™ encoding. This encoding combines different methods of compression with encryption at varying lengths in order to further complicate the process of decoding private data. Unlike traditional code-signing of software, such as a hardware driver or dynamic library, the Centurion™ approach provides a series of tests to verify the software's validity, the areas in memory that it requests access to, how much memory it uses, how much processing it uses, and the functions available to tune its performance up or slow it down. In summary, Centurion™ provides a means to securely load native code and then adjust its performance, resources, and power-consumption based on user needs. Technically speaking, it's an Application Binary Interface (ABI) provided as a binary blob of a compressed, encrypted code library with multiple code signed wrappers. Centurion™ can act as Operating-System-Specific implementations (generally one or more) of various computational services, format import/exports, and database access.

Neutral Zone™. The Elixir™ model of data and code can have one or more of the following three features in Essence™ that respond to harmful or deceptive malware:

(1) Fine granularity of data and code. Many possibility boxes with unique compression and rights make it difficult for malware to just 'get memory' and write to it. Everything is scheduled for read/write operations for parallel issues so the system cannot have string/buffer overruns since there is no native code that is capable of doing so. Many scenarios are avoided given a configuration of the system that uses names, not memory addresses, as these names frequently change.

(2) Given all semantic associations of any behavior, the system can recognize that instructions X want to alter information Y" and it can therefore detect attempts to change conditions that should never happen, such as reading private data or changing user settings, etc.

(3) Rather than escalate the growth of malware with better snoopers, which only refines the effective and continuous malware ecosystem, the system can heal or extract desirable behaviors and neutralize threats.

While the disclosure has been described with respect to a limited number of embodiments and areas of use, those skilled in the art, having benefit of this disclosure, will appreciate that other embodiments may be devised which do not depart from the scope of the disclosure as disclosed herein. The disclosure has been described in detail, it should be understood that various changes, substitutions and alterations could be made hereto without departing from the spirit and scope of the disclosure.

What is claimed is:

1. A method for improving the detail of a digital video signal comprising the steps of:

receiving a digital video signal that comprises a plurality of pixel information records wherein:

a pixel information record comprises a pixel x-location field, a pixel y-location field, and a pixel value field for at least 81 pixels;

the pixel x-location field specifies an x-location in a Cartesian coordinate space for a pixel;

the pixel y-location field specifies a y-location in the Cartesian coordinate space for the pixel; and the pixel values field comprises an amplitude value that is responsive to a brightness of the pixel;

computing second-order gradient data sets for at least a portion of the pixel information records by:

selecting a center pixel from the pixel information records;

selecting a neighborhood size from the group comprising 1, 2, 4, 8, and 16 increments;

computing a first-order-pixel gradient data set before computing a second-order pixel gradient data set; and computing the second-order gradient data sets for smaller neighborhood sizes before computing the second-order gradient data sets for larger neighborhood sizes;

wherein:

a first-order gradient data set comprises computed first-order gradient values for neighboring pixels around the center pixel;

a neighboring pixel is a pixel in the pixel information records that is no further from the center pixel than the neighborhood size;

the distance from the center pixel to the neighboring pixel is measured in increments;

an increment comprises a movement selected from the group of:

movement to an adjacent vertical y-direction pixel;

movement to an adjacent horizontal x-direction pixel; and movement to pixel that is horizontally adjacent to an adjacent vertical pixel; and a first-order gradient value is responsive to:

a neighboring pixel value minus the center pixel value;

a neighboring pixel x-location minus the center pixel x-location; and a neighboring pixel y-location minus the center pixel y-location;

a second-order gradient data set comprises computed second-order gradient values;

the second-order gradient values are calculated for pixel pairs;

pixel pairs are comprised of two neighboring pixels that are adjacent to each other whose first-order gradient values have been calculated; and a second-order gradient value for a pixel pair is responsive to:

a difference in first order gradient values between a neighboring pixel and an adjacent neighboring pixel;

a difference in x-locations between the neighboring pixel and the adjacent neighboring pixel; and a difference in y-locations between the neighboring pixel and the adjacent neighboring pixel; and generating an output digital video in response to the second-order gradient values, wherein;

the output digital video signal has greater detail than the received digital video signal, and generating further comprises using a polynomial equation.

2. The method of claim 1 wherein:

generating the output digital video signal further comprises the step of:

converting a plurality of second-order gradient data sets to quaternions wherein the quaternions comprise imaginary quaternion portions and real quaternion portions.

3. The method of claim 2 wherein:

generating the output digital video signal further comprises the steps of:

calculating quaternion logarithms from the quaternions;

determining first quaternion logarithm values from the quaternion logarithms wherein the first quaternion logarithm values are responsive to the magnitude of the quaternion logarithms;

determining second quaternion logarithm values from the quaternion logarithms wherein the second quaternion logarithm values are responsive to the orientation of the quaternion logarithms;

creating a plurality of pixel quaternion logarithm records that each comprise:

a pixel x-location field for storing the x-location value for the center pixel of the second-order gradient data set from which the first quaternion logarithm value and the second quaternion logarithm value were computed;

a pixel y-location field for storing a y-location value for the center pixel of the second-order gradient data set from which the first quaternion logarithm value and the second quaternion logarithm value were computed;

a neighborhood size field for storing the neighborhood size of the second-order gradient data set from which the first quaternion logarithm value and the second quaternion logarithm value were computed;

a first quaternion logarithm field for storing the first logarithm quaternion logarithm value; and a second quaternion logarithm field for storing the second quaternion logarithm value; and selecting which quaternion logarithm records to use for further computation in response to the information content of a quaternion logarithm record.

4. The method of claim 1 wherein:

the received video signal comprises a color video signal; and the output digital video signal comprises a color video signal.

5. A system for improving the detail of an input video signal comprising:

a computer memory unit for storing the input video signal wherein:

the memory unit is configured for storing the input video signal as pixel information records;

a pixel information record comprises a pixel x-location field, a pixel y-location field, and a pixel value field;

the pixel x-location field specifies an x-location in a Cartesian coordinate space for a pixel;

the pixel y-location field specifies a y-location in the Cartesian coordinate space for the pixel; and the pixel values field comprises a value that is responsive to a brightness of the pixel;

a computation unit that:

selects a center pixel from the pixel information records;

selects a neighborhood size from the group comprising 1, 2, 4, 8, and 16 increments;

computes a first-order-pixel gradient data set corresponding to a center pixel and a neighborhood size wherein:

the computation unit computes a first-order pixel data set for a center pixel at a smaller neighborhood size before computing a first-order pixel data set at a larger neighborhood size;

the first-order gradient data set comprises computed first-order gradient values for neighboring pixels around the center pixel;

a neighboring pixel is a pixel in the pixel information records that is no further from the center pixel than the neighborhood size;

the distance from the center pixel to the neighboring pixel is measured in increments;

an increment comprises a movement selected from the group of:

movement to an adjacent vertical y-direction pixel;

movement to an adjacent horizontal x-direction pixel; and movement to pixel that is horizontally adjacent to an adjacent vertical pixel; and a first-order gradient value is responsive to:

a neighboring pixel value minus the center pixel value;

a neighboring pixel x-location minus the center pixel x-location; and a neighboring pixel y-location minus the center pixel y-location; and computes a second-order pixel gradient data set wherein:

the second order pixel gradient data set is computed from the first order gradient data set;

the second-order gradient data set comprises computed second-order gradient values;

the second-order gradient values are calculated for pixel pairs;

a pixel pair is comprised of two neighboring pixels that are adjacent to each other whose first-order gradient values have been calculated; and a second-order gradient value for a pixel pair is responsive to:

a difference in first order gradient values between a neighboring pixel and an adjacent neighboring pixel;

a difference in x-locations between the neighboring pixel and the adjacent neighboring pixel; and a difference in y-locations between the neighboring pixel and the adjacent neighboring pixel; and an output unit configured for transmitting an output video signal wherein:

the output video signal has greater detail than the input video signal;

the output video signal was generated using a polynomial equation in response to:

the pixel information records; and the second order gradient data set.

6. The system of claim 5 wherein:

the computation unit further converts a second-order gradient data set to a plurality of quaternions wherein a quaternion comprises an imaginary quaternion portion and a real quaternion portion; and the output unit is configured for generating the output video signal in response to the plurality of quaternions.

7. The system of claim 6 wherein:

the computation unit computes a first quaternion logarithm value and a second quaternion logarithm value for the plurality of quaternions wherein:

the first quaternion logarithm value is responsive to the magnitude of the logarithm of a quaternion; and the second quaternion logarithm value is responsive to the orientation of the logarithm of a quaternion;

the system further comprises a temporary quaternion logarithm storage unit for storing quaternion logarithm records wherein a quaternion logarithm record comprises:

a pixel x-location field for storing the x-location value for the center pixel of the second-order gradient data set from which the first quaternion logarithm value and the second quaternion logarithm value were computed;

a pixel y-location field for storing a y-location value for the center pixel of the second-order gradient data set from which the first quaternion logarithm value and the second quaternion logarithm value were computed;

a neighborhood size field for storing the neighborhood size of the second-order gradient data set from which the first quaternion logarithm value and the second quaternion logarithm value were computed;

a first quaternion logarithm field for storing the first logarithm quaternion logarithm value; and a second quaternion logarithm field for storing the second quaternion logarithm value; and the output unit is configured for generating the output video signal in response to the quaternion logarithm records.

8. The system of claim 5 wherein:
the input video signal comprises a color video signal; and
the output digital video signal comprises a color video signal.

9. The system of claim 5 wherein:
the system further comprises a display;
the output unit transmits the output video signal to the display; and
the output video signal is presented as a moving image on the display.

10. The system of claim 5 wherein:
the polynomial equation comprises a quadratic term.

11. The system of claim 5 wherein:
the polynomial equation comprises a piecewise quadratic equation.

12. The system of claim 5 wherein:
the output video signal comprises a digital image signal having detail of at least a 4K video signal in at least one portion.

13. The system of claim 5 wherein:
the system is implemented as part of a computer web browser.

14. The system of claim 6 wherein:
the system is configured for operating on a multi-processor computer; and
the computation unit is configured for parallel processing of quaternion logarithm calculations on the multi-processor computer.

15. The system of claim 5 wherein:
the system further comprises a natural language dialog interface;
the digital output signal is responsive to the natural language dialog interface.

16. The system of claim 5 wherein:
the system only calculates second-order pixel gradient data at the next greater neighborhood size if the second-order pixel gradient data set is not a set of zero numbers.

17. The system of claim 5 wherein:
the output video signal amplitude values have a greater level of detail than the input video signal amplitude values.

18. The system of claim 5 wherein:
the input video signal is processed in real time; and
the level of detail of the output video signal is responsive to compute resources.

19. The system of claim 6 wherein:
the system further comprises a quaternion logarithm record selection unit;
the quaternion logarithm record selection unit is configured for selecting which quaternion logarithm records to use for computation of the output digital signal; and
the quaternion logarithm selection unit is configured for selecting a quaternion logarithm record in response to the information content of the quaternion logarithm record.

20. A system for improving the detail of an input video signal comprising:
a computer-readable memory;
a program stored on the computer-readable memory and adapted to be executed on a processor wherein the computer program is configured for performing the following operations:
storing the input video signal as pixel information records wherein:
a pixel information record comprises a pixel x-location field, a pixel y-location field, and a pixel value field for at least 81 pixels;
the pixel x-location field specifies an x-location in a Cartesian coordinate space for a pixel;
the pixel y-location field specifies a y-location in the Cartesian coordinate space for the pixel; and
the pixel values field comprises a value that is responsive to a brightness of the pixel;
selecting a center pixel from the pixel information records;
selecting a neighborhood size from the group comprising 1, 2, 4, 8, and 16 increments;
computing a first-order-pixel gradient data set corresponding to a center pixel and a neighborhood size wherein:
the program computes a first-order pixel data set for a center pixel at a smaller neighborhood size before computing a first-order pixel data set at a larger neighborhood size;
the first-order gradient data set comprises computed first-order gradient values for neighboring pixels around the center pixel;
a neighboring pixel is a pixel in the pixel information records that is no further from the center pixel than the neighborhood size;
the distance from the center pixel to the neighboring pixel is measured in increments;
an increment comprises a movement selected from the group of:
movement to an adjacent vertical y-direction pixel;
movement to an adjacent horizontal x-direction pixel; and
movement to pixel that is horizontally adjacent to an adjacent vertical pixel; and
a first-order gradient value is responsive to:
a neighboring pixel value minus the center pixel value;
a neighboring pixel x-location minus the center pixel x-location; and
a neighboring pixel y-location minus the center pixel y-location;
computing a second-order pixel gradient data set wherein:
the second order pixel gradient data set is computed from the first order gradient data set;
the second-order gradient data set comprises computed second-order gradient values;
the second-order gradient values are calculated for pixel pairs;
a pixel pair is comprised of two neighboring pixels that are adjacent to each other whose first-order gradient values have been calculated;
a second-order gradient value for a pixel pair is responsive to:
a difference in first order gradient values between a neighboring pixel and an adjacent neighboring pixel;
a difference in x-locations between the neighboring pixel and the adjacent neighboring pixel; and
a difference in y-locations between the neighboring pixel and the adjacent neighboring pixel; and
transmitting an output video signal wherein: the output video signal has greater detail than the input video signal; and the output video signal was generated using a polynomial equation in response to the second order gradient data set.

* * * * *